(12) United States Patent
Kanayama

(10) Patent No.: US 12,459,496 B2
(45) Date of Patent: Nov. 4, 2025

(54) METHOD AND SYSTEM OF CREATING PARKING MOTION FOR AUTONOMOUS VEHICLES

(71) Applicant: Yutaka John Kanayama, Dexter, MI (US)

(72) Inventor: Yutaka John Kanayama, Dexter, MI (US)

( * ) Notice: Subject to any disclaimer, the term of this patent is extended or adjusted under 35 U.S.C. 154(b) by 0 days.

(21) Appl. No.: 19/063,651

(22) Filed: Feb. 26, 2025

(65) Prior Publication Data

US 2025/0289413 A1 Sep. 18, 2025

Related U.S. Application Data

(63) Continuation-in-part of application No. 18/759,555, filed on Jun. 28, 2024, now abandoned, which is a continuation-in-part of application No. 18/605,385, filed on Mar. 14, 2024, now abandoned.

(51) Int. Cl.
*B60W 30/06* (2006.01)
*B60W 60/00* (2020.01)

(52) U.S. Cl.
CPC .......... *B60W 30/06* (2013.01); *B60W 60/001* (2020.02)

(58) Field of Classification Search
CPC .............................. B60W 30/06; B60W 60/001
See application file for complete search history.

(56) References Cited

U.S. PATENT DOCUMENTS

| | | |
|---|---|---|
| 2016/0313133 A1 | 10/2016 | Zeng |
| 2019/0322318 A1 | 10/2019 | Hasejima |
| 2019/0332108 A1 | 10/2019 | Wilkinson |
| 2021/0201680 A1 | 7/2021 | Oh |
| 2022/0073101 A1 | 3/2022 | Wang |
| 2023/0278593 A1* | 9/2023 | Wang .................... B60W 30/06 701/26 |
| 2024/0054895 A1 | 2/2024 | Zhou |

(Continued)

OTHER PUBLICATIONS

Kanayama et al. "A new continuous-curvature line/path-tracking method for car-like vehicles" Advanced Robotics Journal 13:7, pp. 663-689; published 1998.

(Continued)

*Primary Examiner* — Donald J Wallace
(74) *Attorney, Agent, or Firm* — Mitchell Law PLLC; Matthew W. Mitchell

(57) ABSTRACT

A method and system for controlling an autonomous vehicle during a parking motion is disclosed. The method includes receiving information, into a processor onboard the vehicle, from at least one sensor, calculating, via a processor onboard the vehicle, a starting vehicle position and a vehicle direction, calculating, via the processor onboard the vehicle, a goal parking position and a goal parking direction based upon the received information from the sensor, calculating, via the processor onboard the vehicle, a single arch or double arch motion based upon the starting vehicle position, the starting vehicle direction, the goal parking position, and the goal parking direction, and controlling the vehicle, via instructions provided by the processor onboard the vehicle, based upon the calculated single arch or double arch motion and the received information from the at least one sensor.

9 Claims, 21 Drawing Sheets

$((0, 0), 0) \rightarrow ((200, 100), 0)$: forward
$S_0 = 117.8764\ K_0 = 0.0123569$
$S_1 = 117.8764\ K_1 = -0.0123569$
Parallel: Common mate = (100, 50)

$((0, 0), 0) \rightarrow ((100, 100), 0)$: forward
$S_0 = 82.625002,\ K_0 = 0.0298626$
$S_1 = 82.625002,\ K_1 = -0.0298626$
Parallel: Common mate = (50, 50)

(56) References Cited

U.S. PATENT DOCUMENTS

2024/0118102 A1  4/2024  Park
2024/0149867 A1  5/2024  Nakagawa

OTHER PUBLICATIONS

Two Dimensional Transformations and Its Application to Vehicle Motion Control and Analysis; published 1993.
A Circle Tracking Method for Nonholonomic Vehicles Yutaka J. Kanayama and Fariba Fahroo; Published 1997.

* cited by examiner (a) Arch $(S, \varphi) = (200, 0)$ (b) Arch $(S, \varphi) = (200, \pi/6)$ (c) Arch $(S, \varphi) = (200, \pi/3)$ (d) Arch $(S, \varphi) = (200, \pi/2)$ (e) Arch $(S, \varphi) = (200, 2\pi/3)$ (f) Arch $(S, \varphi) = (200, 5\pi/6)$ (g) Arch $(S, \varphi) = (200, \pi)$ (h) Arch $(S, \varphi) = (200, 7\pi/6)$ Forward arch
((0, 0), 0) → ((100, 100), π/2)
$S = 165.250, K = 0.0149313$ Backward arch
((0, 0), 0) → ((-100, -100), π/2)
$S = -165.250, K = -0.0149313$ Begin

| | | | | |
|---|---|---|---|---|
| 1 | 1.000018495 | 1.000073983 | 1.000166472 | 1.000295979 |
| 1.000462525 | 1.000666137 | 1.00090685 | 1.001184702 | 1.00149974 |
| 1.001852017 | 1.00224159 | 1.002668526 | 1.003132894 | 1.003634771 |
| 1.004174243 | 1.004751398 | 1.005366333 | 1.00601915 | 1.00670996 |
| 1.007438878 | 1.008206026 | 1.009011533 | 1.009855534 | 1.010738173 |
| 1.011659599 | 1.012619966 | 1.013619439 | 1.014658186 | 1.015736385 |
| 1.01685422 | 1.018011881 | 1.019209568 | 1.020447485 | 1.021725845 |
| 1.02304487 | 1.024404788 | 1.025805833 | 1.027248251 | 1.028732292 |
| 1.030258217 | 1.031826291 | 1.033436792 | 1.035090004 | 1.036786219 |
| 1.038525738 | 1.040308872 | 1.042135938 | 1.044007265 | 1.045923189 |
| 1.047884056 | 1.049890223 | 1.051942053 | 1.054039922 | 1.056184215 |
| 1.058375326 | 1.060613659 | 1.062899632 | 1.065233668 | 1.067616207 |
| 1.070047695 | 1.072528591 | 1.075059366 | 1.077640503 | 1.080272495 |
| 1.082955848 | 1.085691082 | 1.088478727 | 1.091319328 | 1.094213442 |
| 1.097161639 | 1.100164503 | 1.103222634 | 1.106336644 | 1.10950716 |
| 1.112734823 | 1.116020293 | 1.11936424 | 1.122767356 | 1.126230343 |
| 1.129753925 | 1.133338841 | 1.136985846 | 1.140695716 | 1.144469242 |
| 1.148307236 | 1.152210528 | 1.156179968 | 1.160216427 | 1.164320795 |
| 1.168493985 | 1.172736929 | 1.177050583 | 1.181435927 | 1.185893961 |
| 1.190425712 | 1.19503223 | 1.199714591 | 1.204473895 | 1.209311271 |
| 1.214227875 | 1.219224889 | 1.224303525 | 1.229465025 | 1.234710661 |
| 1.240041735 | 1.245459583 | 1.250965574 | 1.256561108 | 1.262247623 |
| 1.268026591 | 1.273899522 | 1.279867963 | 1.285933501 | 1.292097763 |
| 1.298362416 | 1.304729172 | 1.311199785 | 1.317776055 | 1.324459829 |
| 1.331253001 | 1.338157516 | 1.345175368 | 1.352308606 | 1.359559332 |
| 1.366929704 | 1.374421938 | 1.382038311 | 1.38978116 | 1.397652885 |
| 1.405655955 | 1.413792904 | 1.422066337 | 1.430478931 | 1.43903344 |
| 1.447732694 | 1.456579603 | 1.46557716 | 1.474728446 | 1.484036628 |
| 1.493504967 | 1.503136819 | 1.512935637 | 1.52290498 | 1.533048508 |
| 1.543369996 | 1.55387333 | 1.564562514 | 1.575441677 | 1.586515073 |
| 1.597787089 | 1.609262249 | 1.620945221 | 1.632840818 | 1.64495401 |
| 1.657289926 | 1.669853861 | 1.682651283 | 1.69568784 | 1.708969369 |
| 1.722501901 | 1.736291671 | 1.750345124 | 1.76466893 | 1.779269985 |
| 1.794155428 | 1.809332648 | 1.824809295 | 1.840593294 | 1.856692854 |
| 1.873116483 | 1.889873001 | 1.906971554 | 1.924421629 | 1.942233071 |
| 1.9604161 | 1.978981325 | 1.99793977 | 2.017302886 | 2.037082578 |
| 2.057291225 | 2.077941705 | 2.099047416 | 2.120622309 | 2.142680913 |
| 2.165238364 | 2.188310439 | 2.21191359 | 2.23606498 | 2.260782521 |
| 2.286084914 | 2.311991698 | 2.338523291 | 2.365701044 | 2.393547293 |
| 2.422085415 | 2.451339894 | 2.48133638 | 2.512101766 | 2.543664261 |
| 2.576053468 | 2.609300478 | 2.643437958 | 2.678500257 | 2.714523511 |
| 2.751545764 | 2.789607093 | 2.828749748 | 2.869018297 | 2.910459791 |
| 2.953123937 | 2.997063289 | 3.042333452 | 3.08899331 | 3.137105269 |
| 3.186735523 | 3.237954346 | 3.290836415 | 3.345461154 | 3.401913119 |
| 3.460282422 | 3.520665189 | 3.583164076 | 3.647888828 | 3.7149569 |
| 3.784494155 | 3.856635616 | 3.931526326 | 4.009322288 | 4.090191521 |
| 4.174315242 | 4.261889182 | 4.353125072 | 4.448252309 | 4.54751984 |
| 4.651198288 | 4.75958236 | 4.87299359 | 4.991783461 | 5.116336973 |
| 5.247076736 | 5.384467676 | 5.529022465 | 5.681307816 | 5.841951786 |
| 6.011652313 | 6.19118721 | 6.381425926 | 6.583343448 | 6.798036817 |
| 7.026744839 | 7.270871747 | 7.532015769 | 7.812003821 | 8.11293393 |
| 8.437227451 | 8.787693855 | 9.167611728 | 9.580830949 | 10.03190279 |
| 10.52624725 | 11.07037075 | 11.67215263 | 12.34122749 | 13.08950279 |
| 13.93187098 | 14.8872075 | 15.97979766 | 17.24142435 | 18.71450349 |
| 20.45693636 | 22.54988621 | 25.11076429 | 28.31600868 | 32.4435095 |
| 37.95776784 | 45.69813692 | 57.35250269 | 76.89209392 | 116.404649 |

End

FIG. 11

((0, 0), 0) → ((200, 100), 0): forward
$S_0 = 117.8764$ $K_0 = 0.0123569$
$S_1 = 117.8764$ $K_1 = -0.0123569$
Parallel: Common mate = (100, 50)

((0, 0), 0) → ((100, 100), 0): forward
$S_0 = 82.625002$, $K_0 = 0.0298626$
$S_1 = 82.625002$, $K_1 = -0.0298626$
Parallel: Common mate = (50, 50)

((0, 0), 0) → ((-200, -100), 0);
backward;
$S_0 = -117.8764$, $K_0 = -0.0123569$
$S_1 = -117.8764$, $K_1 = 0.0123569$
Parallel: Common mate = (100, 50)

((0, 0), 0) → ((200, 0), π/2),
forward; two-arch motion:
$S_0 = 104.679854$, $K_0 = -0.0127062$
$S_1 = 171.927064$, $K_1 = 0.0220877$
Common mate = (91.32793, -41.15521)

((0, 0), 0) → ((-200, 0), -π/2),
backward; two-arch motion:
$S_0 = -104.679854$, $K_0 = -0.0127062$
$S_1 = -171.927064$, $K_1 = 0.0220877$
Common mate = (-91.32793, -41.15521)

$((0, 0), 0) \rightarrow ((200, 100), -\pi/8)$;
forward general two-arch motion:
$S_0 = 128.819508$, $K_0 = 0.013551833$
$S_1 = 121.45171$, $K_1 = -0.01945292$
Common mate = $(101.384911, 62.95563)$ $((0, 0), 0) \rightarrow ((200, 100), 0)$:
forward, parallel: a two-arch motion:
$S_0 = 117.87643650$, $K_0 = 0.0123569388$
$S_1 = 117.87643650$, $K_1 = -0.0123569388$
Common mate = $(100, 50)$ $((0, 0), 0) \rightarrow ((200, 100), \pi/8)$:
forward, general: two-arch motion:
$S_0 = 138.222994$, $K_0 = 0.00872500$
$S_1 = 92.11513315$, $K_1 = -0.00639575$
Common mate = $(123.617663, 49.91357389)$ ((0, 0), 0) → ((-200, -100), -π/8):
backward, general two-arch motion:
$S_0 = -128.819508$, $K_0 = -0.013551833$
$S_1 = -121.451717$, $K_1 = 0.01945292$
Common mate = (-101.384911, -62.955635)

((0, 0), 0) → ((-200, -100), 0):
backward, parallel: two-arch motion:
$S_0 = -117.87643650$, $K_0 = -0.0123569388$
$S_1 = -117.87643650$, $K_1 = 0.0123569388$
Common mate = (-100, -50)

((0, 0), 0) → ((-200, -100), π/8):
backward, general: two-arch motion:
$S_0 = -138.222994$, $K_0 = -0.00872500$
$S_1 = -92.11513315$, $K_1 = 0.00639575$
Common mate = (-123.617663, -49.91357389)

METHOD AND SYSTEM OF CREATING PARKING MOTION FOR AUTONOMOUS VEHICLES

CROSS REFERENCE TO RELATED APPLICATIONS

This application is a continuation-in-part of U.S. patent application Ser. No. 18/759,555, filed on Jun. 28, 2024, which is a continuation of U.S. patent application Ser. No. 18/605,385, filed on Mar. 14, 2024, the disclosures of which are incorporated herein by reference in their entirety.

TECHNICAL FIELD

This disclosure relates to vehicle control, particularly to creating parking motion for autonomous vehicles.

BACKGROUND

Autonomous vehicle control technology is a major area of innovation being worked on in the automotive industry, universities, and government agencies. Several reports say negative assessments of the latest research and development. Several companies announced that they would stop investing in this area.

Hence, there is a need for improved methods of autonomous vehicle control. FIG. 1 depicts geometric relationships in and around a four-way intersection, where a vehicle is supposed to arrive from the west into frame $q_0$. One of the purposes of this invention is for a vehicle to negotiate such an intersection, creating precise right turning: $q_0 \to q_1$, no turning: $q_0 \to q_2$, or left turning: $q_0 \to q_3$. Several reports mentioned that the latest technology has difficulty turning left at intersections, causing jams and accidents.

Furthermore, there were no reports that an autonomous vehicle parks itself exactly in a parking slot bounded by white lines, either head-in or back-in, in a large shopping center parking lot. Once a vehicle leaves its garage, it must eventually park and stop at a particular place, switching the heading orientation from forward to backward and vice versa.

SUMMARY

Method of controlling an autonomous vehicle during a parking motion are disclosed. The method includes controlling a vehicle from start to goal, forward or backward, using a single-arch or double-arch motion, and minimizing the total motion cost. This method creates parking motion that controls a vehicle by two control variables $(v, \kappa)$=(velocity, path curvature).

Stereo vision is mostly appropriate for sensors in this vehicle motion-creation method. For instance, in FIG. 1, the sensor installed on the vehicle positioned at $q_0$ senses the distances and orientations to center lines, boundaries of lanes, crossing lines, the walking way, and others. Then, we can compute the exact frames of $q_1$, $q_2$, or $q_3$ using the two-dimensional transformation theory.

BRIEF DESCRIPTION OF THE DRAWINGS

FIG. 11 is the arch-code ratio $\Sigma(\varphi)$ table for φ=0° to 279° at an interval of 1°.

DETAILED DESCRIPTION

1. The 2D Transformation Theory

Figure 1:
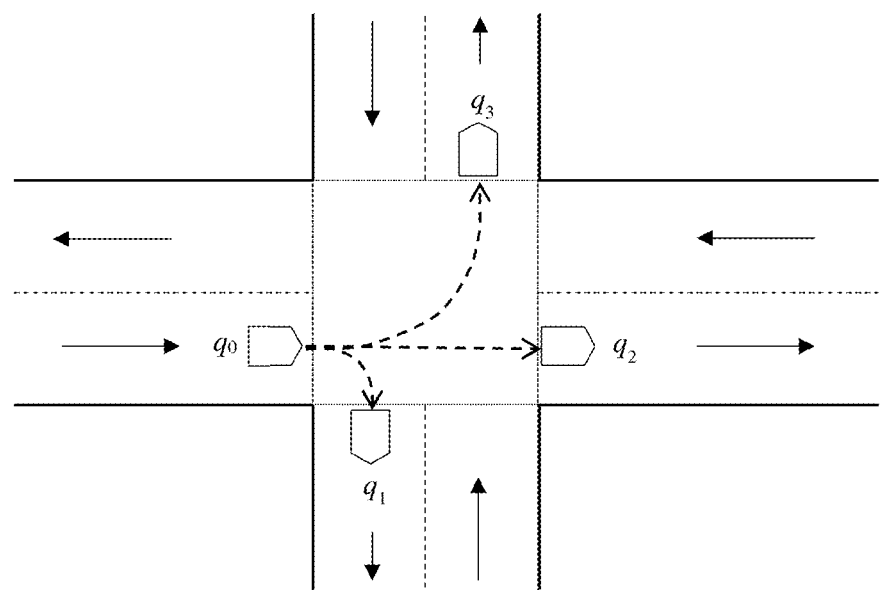
FIG. 1 depicts a four-way intersection, where a vehicle arrives from the west and makes turns.
Figure 2:
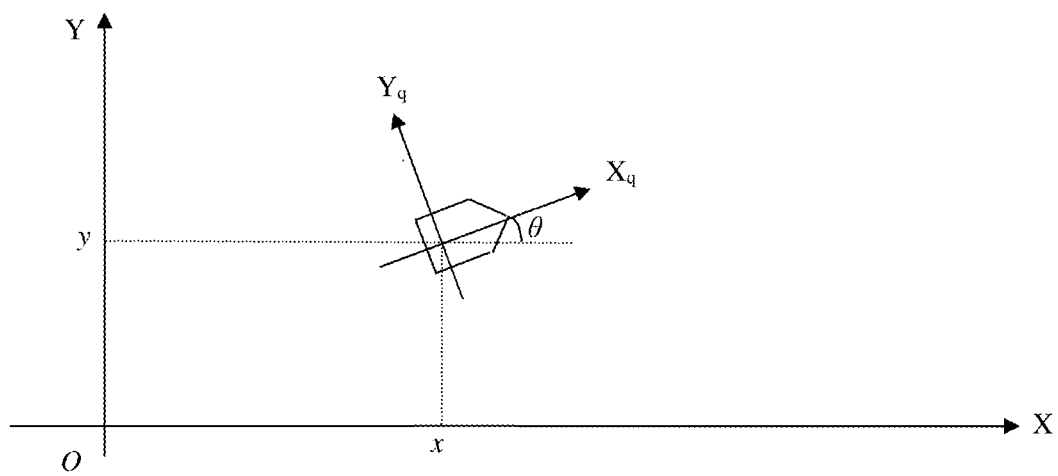
FIG. 2 depicts a vehicle frame (p, θ)=((x, y), θ) in the global coordinate system.
Figure 3:
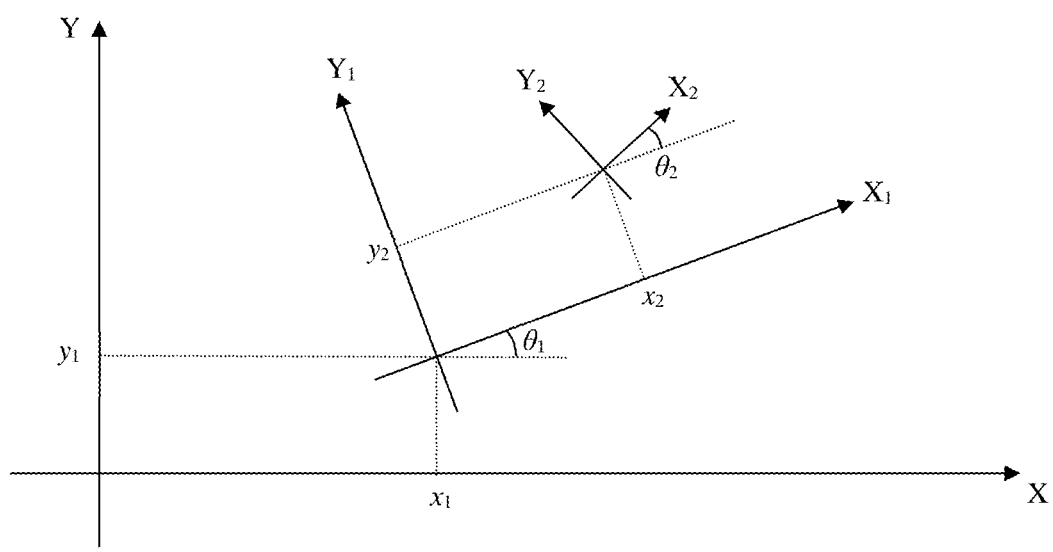
FIG. 3 illustrates how the composition operation works.

This theory provides elementary arithmetic in positioning and moving two-dimensional rigid body vehicles. We define a Cartesian coordinate system (X, Y) in the Autonomous Vehicle (AV) playground. In the Cartesian coordinate system, we call the pair of a vehicle position (x, y) and a vehicle heading direction θ a frame: q=((x, y), θ), with real numbers x, y, and θ. (FIG. 2) The same mathematical structure q= ((x, y), θ) may represent a 2D transformation. The transformation ((x, y), θ) is a composition of two elementary transformations sequentially: a translation ((x, y), 0) and a rotation ((0, 0), θ) in this order. (FIG. 3).

2. Transformations and Their Composition

Let T denote the set of all transformations. Let $q_1$ and $q_2$ be two transformations in T, $q_1=((x_1, y_1), q_1)$ and $q_2=((x_2, y_2), q_2)$. We define their composition $q_1 \cdot q_2$ as follows:

$$q_1 \cdot q_2 = ((x_1, y_1), q_1) \cdot ((x_2, y_2), q_2) = \qquad (2.1)$$
$$((x_1 + x_2 \cos q_1 - y_2 \sin q_1, y_1 + x_2 \sin q_1 + y_2 \cos q_1), q_1 + q_2)$$

Then, $q_1 \cdot q_2$ is also a transformation. FIG. 3 shows the geometrical interpretation of the composition operation.

Lemma 2.1 (Associativity): The following equality holds for any transformations $q_1$, $q_2$, and $q_3$ in T:

$$(q_1 \cdot q_2) \cdot q_3 = q_1 \cdot (q_2 \cdot q_3) \qquad (2.2)$$

(2.3) Identity: If $q_0 \cdot q = q \cdot q_0 = q$ holds for any q in T, we call the transformation $q_0$ identity transformation.

Lemma 2.2 (Identity): A transformation $e = ((0, 0), 0)$ in T is an identity transformation.

(2.4) Inverse: Let us define the inverse transformation of a given transformation q. For a transformation q in T, if $q_1$ in T satisfies an equality $q \cdot q_1 = q_1 \cdot q = e$, we call $q_1$ the inverse of q, $q^{-1}$.

Lemma 2.3 (Inverse): For a transformation $q = ((x, y), \theta)$ in T, its inverse $q^{-1}$ exists:

$$q^{-1} = ((-x\cos\theta - y\sin\theta, x\sin\theta - y\cos\theta), -\theta) \qquad (2.5)$$

3. Transformation Group

Theorem 3: Transformation Group: The set T of transformations forms a non-abelian group under the composition operation (·) because (a) T is closed under the composition operation (·); (b) The composition is associative by Lemma 2.1; (c) There exists an identity e in T by Lemma 2.2; (d) An inverse transformation $q^{-1}$ exists for any transformation q by Lemma 2.3. QED

4. Mate: a Binary Relation Between Two Frames

Figure 4:
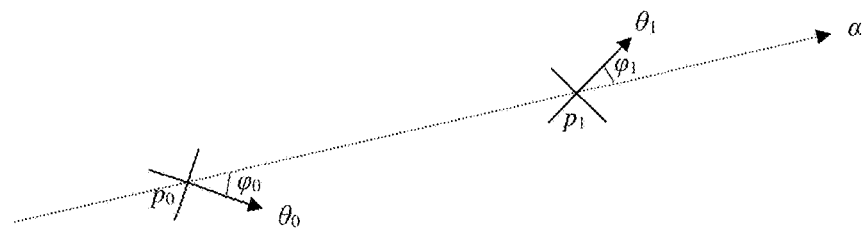
FIG. 4 illustrates that two frames form a mate.

Let $q_0 \equiv (p_0, \theta_0) \equiv ((x_0, y_0), \theta_0)$ and $q_1 \equiv (p_1, \theta_1) \equiv ((x_1, y_1), \theta_1)$ be two frames with $p_0 \neq p_1$, and let $\alpha$ be the direction from position $p_0$ to position $p_1$. If $$(\alpha - \theta_0) + (\alpha - \theta_1) = 0 \qquad (4.1)$$

holds, we call the frame pair $\langle q_0, q_1 \rangle$ a mate. (FIG. 4)

5. Curves and Arches

We define a curve by a continuous curvature function $\kappa$ of arc length s and a total length S:

$$\kappa = \kappa(s), \ 0 \le s \le S \text{ or } S \le s \le 0 \qquad (5.1)$$

Figure 5:
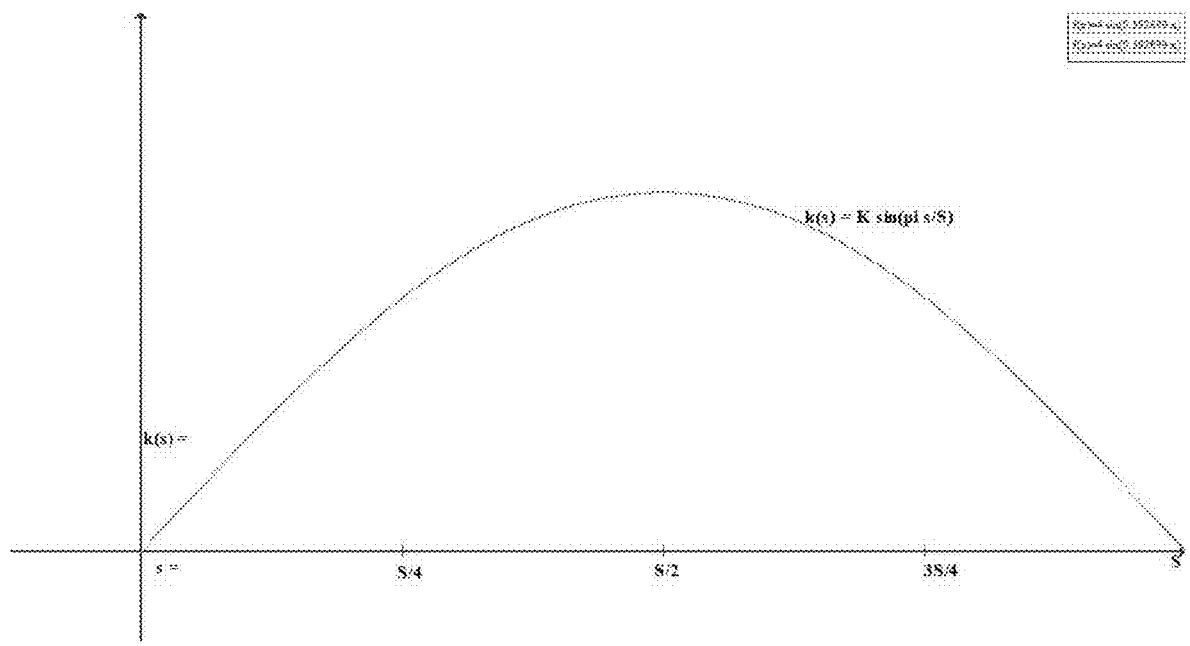
FIG. 5 is an arch curvature function $K \sin(\pi s/S)$ graph.

We call a curve $\kappa(s)$ that satisfies the following equation an arch:

$$\kappa(s) = K\sin\left(\frac{\pi s}{S}\right), \ 0 \le s \le S \text{ or } S \le s \le 0 \qquad (5.2)$$

where K is the maximum curvature, and S is the total arc length. The parameters S and K are positive or negative. An arch's curvature function $\kappa(s)$ is shown in FIG. 5, a familiar sinusoidal function. Let us compute the direction $\theta(t)$ of an arch at $s=t$ using (5.2), $$\theta(t) = \int_0^t K\sin\left(\frac{\pi s}{S}\right)ds = \frac{KS}{\pi}\left[-\cos\left(\frac{\pi s}{S}\right)\right]_0^t ds = \frac{KS}{\pi}\left(1 - \cos\left(\frac{\pi t}{S}\right)\right) \qquad (5.3)$$

We call the difference $\theta_1 - \theta_0$ between the end directions $\theta_1$ and $\theta_0$ the end angle $\varphi$ of an arch. An end angle $\varphi$ is either positive or negative. Therefore, $$\varphi = \theta_1 - \theta_0 = \theta(S) = \int_0^S K\sin\left(\frac{\pi s}{S}\right)ds = \frac{2KS}{\pi} \qquad (5.3)$$

Therefore, $$K = \frac{\pi}{2S}\varphi \text{ or } KS = \frac{\pi\varphi}{2} \qquad (5.4)$$

Figure 6:
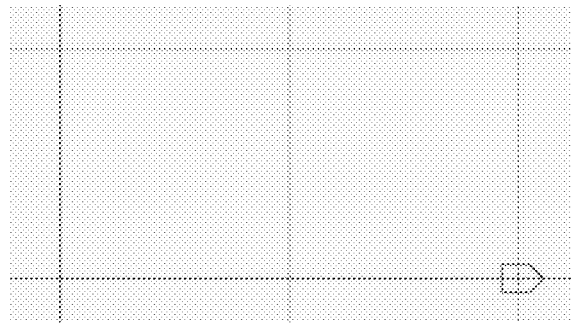
FIG. 6 showcases four arches with several end angles φ with S=200.
Figure 6:
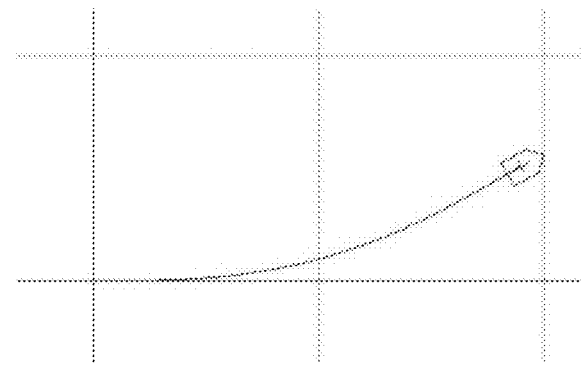
Figure 6:
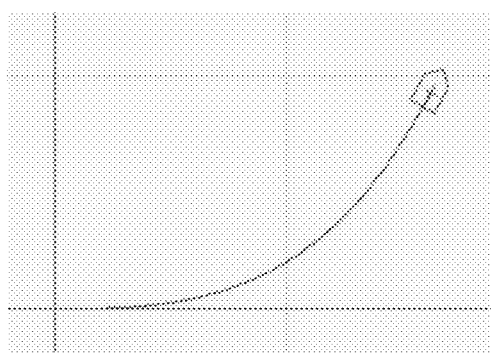
Figure 6:
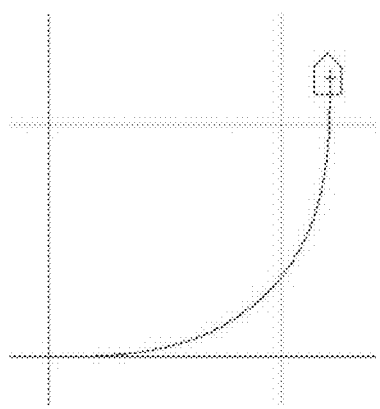
Figure 7:
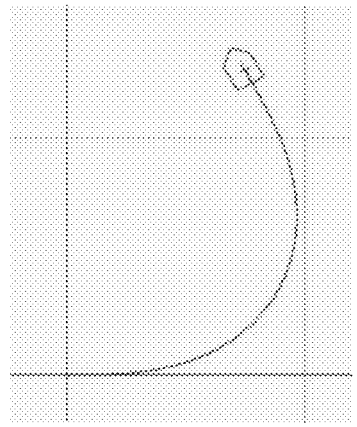
FIG. 7 showcases four arches with several end angles φ with S=200.
Figure 7:
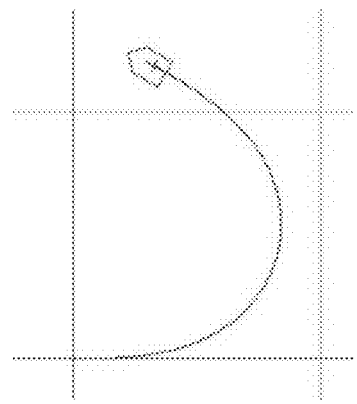
Figure 7:
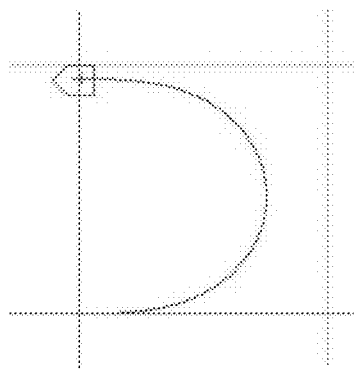
Figure 7:
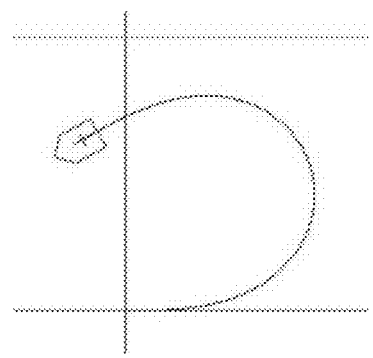

FIG. 6: Four arches with S=200, and $\varphi=0, \pi/6, \pi/3$, and $\pi/2$
FIG. 7: Four arches with S=200, and $\varphi=2\pi/3, 5\pi/6, \pi$, and $7\pi/6$

6. Cost of Curves and Arches

We define the cost (or complexity) $\Gamma$ of a curve k(s) as:

$$\Gamma(\kappa(s)) = \int_0^S \left(\frac{dk(s)}{ds}\right)^2 ds, \ 0 \le s \le S \qquad (6.1)$$

Then,
Theorem 6. The cost of an arch $$\kappa(s) = K\sin\left(\frac{\pi s}{S}\right),$$

$0 \le s \le S$, is equal to $$\Gamma(\kappa(s)) = \frac{\pi^4}{8}\frac{\varphi^2}{S^3}.$$

Proof
We obtain the curvature function's derivative and its square:

$$\frac{d\kappa(s)}{ds} = \frac{\pi K}{S}\cos\left(\frac{\pi s}{S}\right)$$

$$\left(\frac{dk}{ds}\right)^2 = \frac{\pi^2 K^2}{S^2}\cos^2\left(\frac{\pi s}{S}\right) = \frac{\pi^2 K^2}{2S^2}\left(1 + \cos\left(\frac{2\pi s}{S}\right)\right)$$

We integrate the last equation from s=0 to s=S to obtain the arch cost:

$$\Gamma = \int_0^S \left(\frac{dk}{ds}\right)^2 ds =$$

$$\frac{\pi^2 K^2}{2S} + \frac{\pi^2 K^2}{2S^2}\int_0^S \cos\left(\frac{2\pi s}{S}\right)ds = \frac{\pi^2 K^2}{2S} = \frac{\pi^2\left(\frac{\pi\varphi}{2S}\right)^2}{2S} = \frac{\pi^4}{8}\frac{\varphi^2}{S^3}$$

QED

7. An Arch Creates a Mate

Figure 8:
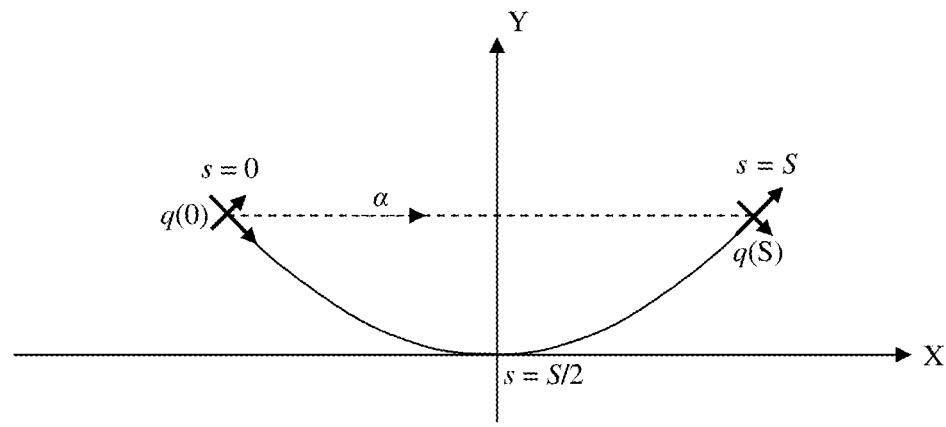
FIG. 8 describes the geometry of an arch around its midpoint.

FIG. 8 depicts the situation around an arch $\kappa(s)$ at its midpoint, $s=S/2$. The coordinate system is transformed to global $((0, 0), 0)$ at the midpoint of the arch.

Lemma 7.1: Let $\theta(t)$ be the tangential direction of an arch $\kappa(s)$ at $s=t$ in the new coordinate system. For any t with $0 \leq t \leq S$, $$\frac{\theta(t) + \theta(S-t)}{2} = \theta\left(\frac{S}{2}\right) = 0 \quad (7.1)$$

Proof

Let $0 \leq t \leq S/2$. Then, $$\theta(t) = \int_0^t k(s)ds = \int_0^{\frac{S}{2}} k(s)ds - \int_{\frac{S}{2}}^t k(s)ds = -\int_{\frac{S}{2}}^t \kappa(s)ds = A.$$

$$\theta(S-t) = \int_0^{S-t} k(s)ds = \int_0^{\frac{S}{2}} k(s) + \int_{\frac{S}{2}}^{S-t} k(s)ds = \int_{\frac{S}{2}}^{S-t} \kappa(s)ds = B.$$

However, the integrals A and B must be equal because of the symmetric property of curvature (5.2). Thus, Lemma 7.1 is proven.

QED

Theorem 7: An arch's initial and end frames, $q(0)$ and $q(S)$, form a mate.

Proof

FIG. 8 shows an arch after applying a transformation such that its mid-frame $q(S/2)$ is $((0, 0), 0)$. Namely, $$x\left(\frac{S}{2}\right) = y\left(\frac{S}{2}\right) = \theta\left(\frac{S}{2}\right) = 0.$$

Then, by Lemma 8.1, $\theta(t) + \theta(S-t) = 0$ and $\theta(S-t) = -\theta(t)$ for any t with $0 \leq t \leq S$.

I. Proving that (7.2) $x(t) = -x(S-t)$ for any t with $0 \leq t \leq S$.

$$x(t) = \int_0^t \cos(\theta(s))ds = \int_0^{\frac{S}{2}} \cos(\theta(s))ds - \int_{\frac{S}{2}}^t \cos(\theta(s))ds =$$

$$x\left(\frac{S}{2}\right) - \int_{\frac{S}{2}}^t \cos(\theta(s))ds = -\int_{\frac{S}{2}}^t \cos(\theta(s))ds$$

Because we know that $x(S/2)=0$. Next, $$x(S-t) = \int_0^{S-t} \cos(\theta(s))ds = \int_0^{\frac{S}{2}} \cos(\theta(s))ds + \int_{\frac{S}{2}}^{S-t} \cos(\theta(s))ds =$$

$$x\left(\frac{S}{2}\right) - \int_{\frac{S}{2}}^{S-t} \cos(\theta(s))ds = \int_{\frac{S}{2}}^{S-t} \cos(\theta(s))ds$$

Let $u=S-s$. Then $du=-ds$:

$$\int_{\frac{S}{2}}^{S-t} \cos(\theta(s))ds =$$

$$\int_{\frac{S}{2}}^t \cos(\theta(S-u))(-du) = -\int_{\frac{S}{2}}^t \cos(-\theta(u))du = \int_{\frac{S}{2}}^t \cos(\theta(u))du$$

Therefore, we proved (7.2) $x(t) = -x(S-t)$ for any t with $0 \leq t \leq S$.

II. Proving that (7.3) $y(t) = y(S-t)$ for any t with $0 \leq t \leq S$.

$$y(t) = \int_0^t \sin(\theta(s))ds =$$

$$\int_0^{\frac{S}{2}} \sin(\theta(s))ds - \int_{\frac{S}{2}}^t \sin(\theta(s))ds = y\left(\frac{S}{2}\right) - \int_{\frac{S}{2}}^t \sin(\theta(s)) = -\int_{\frac{S}{2}}^t \sin(\theta(s))ds,$$

because $y(S/2)=0$. Furthermore, $$y(S-t) = \int_0^{S-t} \sin(\theta(s))ds = \int_0^{\frac{S}{2}} \sin(\theta(s))ds + \int_{\frac{S}{2}}^{S-t} \sin(\theta(s))ds =$$

$$y\left(\frac{S}{2}\right) + \int_{\frac{S}{2}}^{S-t} \sin(\theta(s))ds = \int_{\frac{S}{2}}^{S-t} \sin(\theta(s))ds$$

Let $u=S-s$ or $s=S-u$. Then $du=-ds$:

$$\int_{\frac{S}{2}}^{S-t} \sin(\theta(s))ds =$$

$$\int_{\frac{S}{2}}^{S-t} \sin(\theta(S-s))ds = -\int_{\frac{S}{2}}^t \sin(\theta(u))(-du) = \int_{\frac{S}{2}}^t \sin(\theta(u))\,du =$$

$$\int_0^{\frac{S}{2}} \sin(\theta(u))du - \int_t^{\frac{S}{2}} \sin(\theta(u)) = -\int_t^{\frac{S}{2}} \sin(\theta(u))du = y(S-t)$$

Therefore, $y(t) = y(S-t)$ for any t with $0 \leq t \leq S$.

Therefore, the direction $\alpha$ from the initial endpoint $p(0)$ to the last endpoint $p(S)$ is 0.

Furthermore, $\theta(0) = -\theta(S)$ by Lemma 7.1. Because $\alpha=0$, $(\alpha-\theta(0))+(\alpha-\theta(0))=-(\theta(0)+\theta(S))=0$. Therefore, both end frames of an arch form a mate pair.

QED

8. Similarity of Arches

Figure 9:
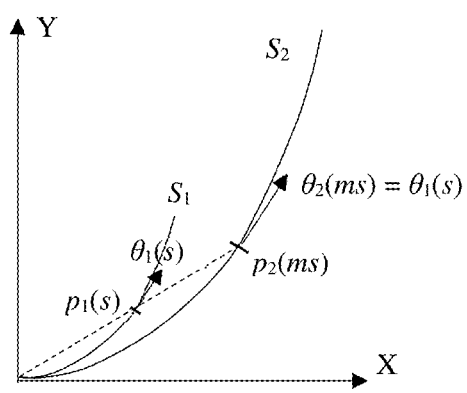
FIG. 9 illustrates two similar arches.

We consider two arches, $\kappa_1(s)$ and $\kappa_2(s)$, as follows (FIG. 9):

$$\kappa_1(s) = K_1 \sin\left(\frac{\pi s}{S_1}\right), \ 0 \leq s \leq S_1 \quad (8.1)$$

$$k_2(s) = K_2 \sin\left(\frac{\pi s}{S_2}\right), \ 0 \leq s \leq S_2 \quad (8.2)$$

$$K_1 S_1 = K_2 S_2 \quad (8.3)$$

Since $K_1 S_1 = K_2 S_2$, $K_1/K_2 = S_2/S_1$, the above two arches have an identical end angle $\varphi$ because of (5.4). If we let $S_2/S_1 = m$ for some m, $S_2 = m S_1$ and $K_2 = K_1/m$.

Lemma 8: As to the two arches given by Equations (8.1), (8.2), and (0.3), the following equality regarding tangential directions $\theta_1$ and $\theta_2$ holds for any u such that $0 \leq u \leq S_1$:

$$\theta_1(u) = \theta_2(mu) \quad (8.4)$$

Proof

Let us define a variable t=ms and dt=mds. Then, using this variable conversion, $$\theta_2(mu) = \int_0^{mu} \kappa_2(t)dt = \int_0^{mu} K_2 \sin\left(\frac{\pi t}{S_2}\right)dt =$$

$$\int_0^u \frac{K_1}{m} \sin\left(\frac{\pi ms}{mS_1}\right)mds = \int_0^u K_1 \sin\left(\frac{\pi s}{S_1}\right)ds = \int_0^u K_1(s)ds = \theta_1(u)$$

QED

Theorem 8 (Similarity): Let arches $\kappa_1$ and $\kappa_2$ defined by Equations (8.1), (8.2), and (8.3). Then, the following equations hold for any u such that $0 \leq u \leq S$:

$$mx_1(u) = x_2(mu) \quad (8.5)$$

$$my_1(u) = y_2(mu) \quad (8.6)$$

Therefore, we have proven that the two arches are similar.

Proof

We define a variable t=ms, dt=mds. Using Equations (8.4), we have $$x_2(mu) = \int_0^{mu} \cos(\theta_2(t))dt =$$

$$\int_0^{mu} \cos\left(\theta_1\left(\frac{t}{m}\right)\right)dt = \int_0^u \cos(\theta_1(s))mds = m\int_0^u \cos(\theta_1(s))ds = mx_1(u)$$

Likewise, we have $y_2(mu)=my_1(u)$. Therefore, the two arches are similar.

QED

9. The Cord of an Arch

We revisit the arch equation:

$$\kappa(s) = K\sin\left(\frac{\pi s}{S}\right), 0 \leq s \leq S \quad (9.1)$$

Figure 10:
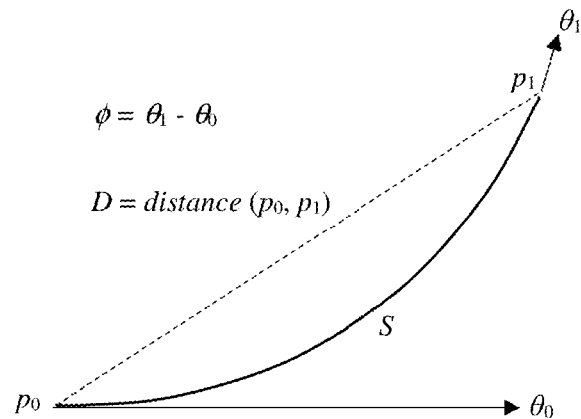
FIG. 10 illustrates an arch and its cord D.

We call the distance between the two endpoints of an arch the cord D. (FIG. 10) The absolute value |S| of the total arc length S and cord D are proportional. We define the arch-cord ratio $\Sigma(\varphi)$ as follows:

$$\sum(\varphi) = S/D \quad (9.2)$$

$\Sigma(0)=1$, and for all other $\varphi$, $\Sigma(\varphi)>1$. $\Sigma(\varphi)$ monotonically increases over $\varphi$ because cord monotonically decreases over $\varphi$. Therefore, if we have a cord D and end angle $\varphi$, we obtain S as $$S = D\sum(\varphi) \quad (9.3)$$

We computed arch-code ratios $\Sigma(\varphi)$ offline for $\varphi=0°$ to $279°$ at an interval of $1°$ as shown in FIG. 11.

10. Creating a Single-Arch Motion for a Mate $<q_a, q_b>$, Based on $q_a=(p_a, \theta_a)=((x_a, y_a), \theta_a)$, and $q_b=(p_b, \theta_b)=((x_b, y_b), \theta_b)$:

If a parking problem input $<q_a, q_b>$ is a mate, Theorem 7 tells us we can create an arch that connects both end frames $q_a$ and $q_b$ as the solution.
1. Let $\varphi=\theta_b-\theta_a$.
2. With interpolation, obtain $\Sigma(\varphi)$ by looking up FIG. 11 arch-cord-ratio.
3. Let D=distance ($p_a$, $p_b$).
4. Let $S=D \Sigma(\varphi)$ from (9.3).
5. If vehicle orientation is backward, let $S=-D \Sigma(\varphi)$.
6. Let $$K = \frac{\pi\varphi}{2S} \text{ from (5.3)}.$$

Figure 12:
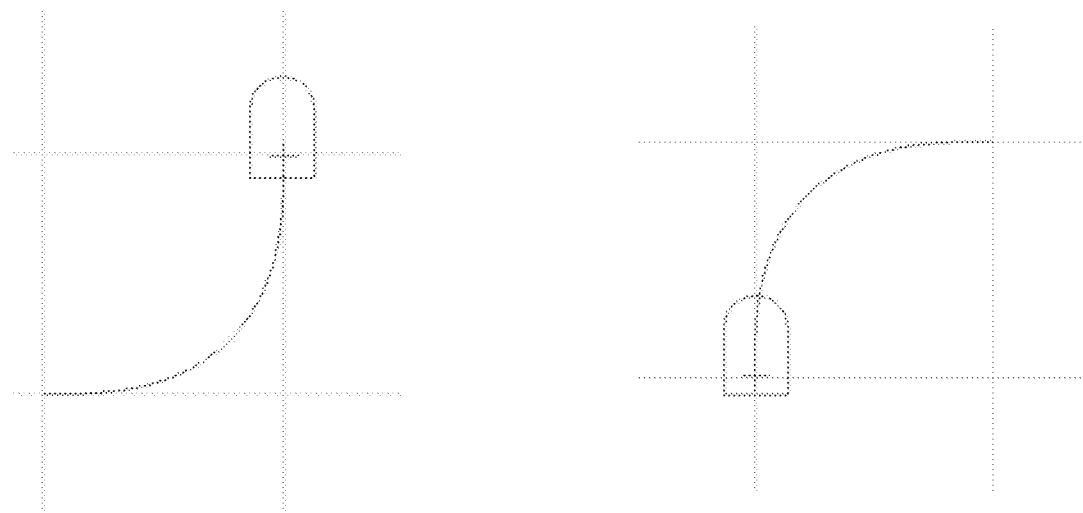
FIG. 12 showcases single-arch motions, forward (left) and backward (right).

The above method creates an arch motion with parameters S, and K. FIG. 12 showcases single-arch motions, forward (left) and backward (right).

12. Solution for Parallel Case: $\theta_0=\theta_1$

Now, we give the least-cost solution for parallel cases.

Figure 13:
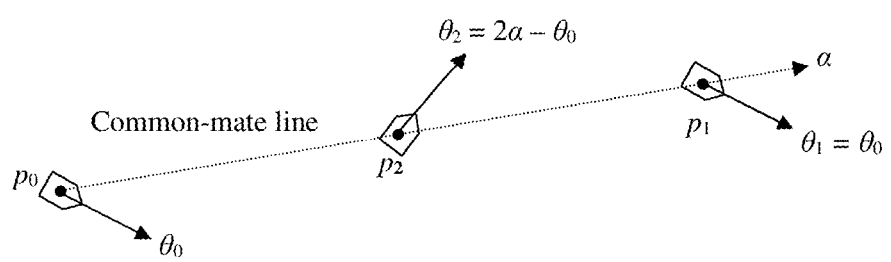
FIG. 13 illustrates a parallel case, a common mate, and the common-mate line.

Lemma 12: Common mate in parallel case: Let start=$q_0=(p_0, \theta_0)$ and goal=$q_1=(p_1, \theta_1)$ be two given frames with $p_0 \neq p_1$ and $\theta_0=\theta_1$. Let $\alpha$ be the direction from $p_0$ to $p_1$, and let $p_2$ be an arbitrary point on $p_0p_1$. Then, the following frame $q_2$ is a common mate of $q_0$ and $q_1$ (FIG. 13).

$$q_2 = (p_2, \theta_2) = (p_2, 2\alpha - \theta_0) \quad (12.1)$$

Proof

Because $(\alpha-\theta_0)+(\alpha-\theta_2)=2\alpha-\theta_0-(2\alpha-\theta_0)=0$, $q_0$ and $q_2$ are mate.

Because $(\alpha-\theta_2)+(\alpha-\theta_1)=2\alpha-(2\alpha-\theta_0)-\theta_1=0$, $q_2$ and $q_1$ are mate.

We call this line $p_0p_1$ a common-mate line.

QED

Using the above $q_2$, we have a two-arch parking solution using arch A, which is defined by $q_0$ and $q_2$, and arch B, which is defined by $q_2$ and $q_1$. However, we have the best solution, as follows:

Theorem 12: Let start=$(p_0, \theta_0)$ and goal=$(p_1, \theta_1)$ be two given frames with $p_0 \neq p_1$ and $\theta_0=\theta_1$. Let $\alpha$ be the direction from $p_0$ to $p_1$, and let $p_2$ be an arbitrary point on line $p_0p_1$. Then, the frame $$q_2 = \text{inflection} = (((x_0+x_1)/2, (y_0+y_1)/2), 2\alpha - \theta_0) \quad (12.2)$$

produces the minimal-cost parking solution for (start, goal).

Proof

We assume that an arbitrary mate $q_2$ is taken on the common-mate line. The motion we obtain via $q_2$ consists of two arches for $<q_0, q_2>$ and $<q_2, q_1>$. From Theorem 6, the total cost C of the two arches is:

$$C = \left(\frac{\pi^4}{8}\right)\left(\frac{\varphi_0^2}{S_0^3} + \frac{\varphi_1^2}{S_1^3}\right), \quad (12.3)$$

where $S_0$ and $S_1$ are their total arc lengths of arches, and $\varphi_0$ and $\varphi_1$ are their end angles. In this case, the equations below hold:

$$\varphi_0 = (2\alpha - \theta_0) - \theta_0 = 2(\alpha - \theta_0) = \text{constant}$$
$$\varphi_1 = \theta_1 - (2\alpha - \theta_0) = \theta_1 + \theta_0 - 2\alpha = 2\theta_0 - 2\alpha = 2(\theta_0 - \alpha) = \text{constant}$$

Because $\varphi_0^2 = \varphi_1^2 = $ constant, minimizing C in (12.3) is equivalent to minimizing C' in the following equation:

$$C' = \frac{1}{S_0^3} + \frac{1}{S_1^3} \quad (12.4)$$

Let z be distance $(p_0, p_2)$ and Z be distance $(p_0, p_1)$, where Z is a constant. Then, $S_0$ and $S_1$ are proportional to z and Z−z, respectively (Section 9). Therefore, finding a common mate that minimizes the cost C' in (13.2) is equivalent to finding z that minimizes the following C":

$$C'' = \frac{1}{z^3} + \frac{1}{(Z-z)^3} \quad (12.5)$$

The derivative of C" for z is:

$$\frac{dC''}{dz} = \frac{-3}{z^4} - \frac{-3}{(Z-z)^4} = \frac{3}{(Z-z)^4 z^4}\left[z^4 - (Z-z)^4\right] = \frac{3}{(Z-z)^4 z^4}\left[(z^2 + (Z-z)^2)\right]\left[z^2 - (Z-z)^2\right]$$
$$= \frac{3}{(Z-z)^4 z^4}\left[(z^2 + (Z-z)^2)\right][(2z - Z)Z]$$

Then, if $z<Z/2$, $dC'/dz<0$; otherwise, $dC'/dz>0$. Therefore, $z=Z/2$ minimizes C". Thus, we obtain the least-cost common mate if it is a midpoint.

QED

Figure 14:
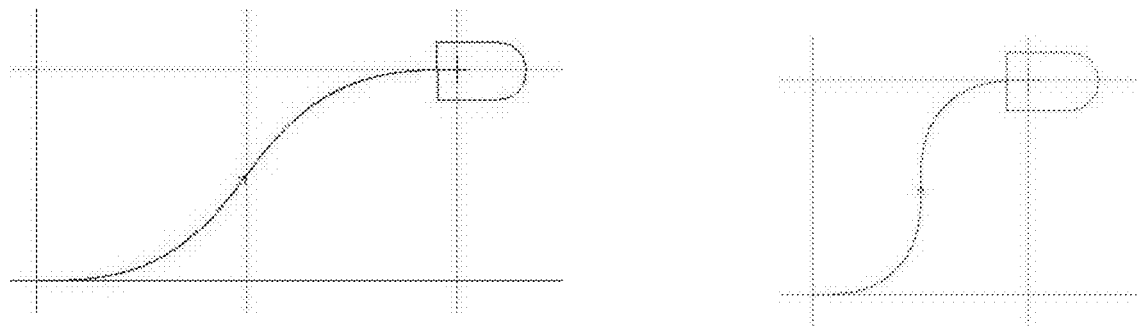
FIG. 14 illustrates two forward parallel motions.
Figure 15:
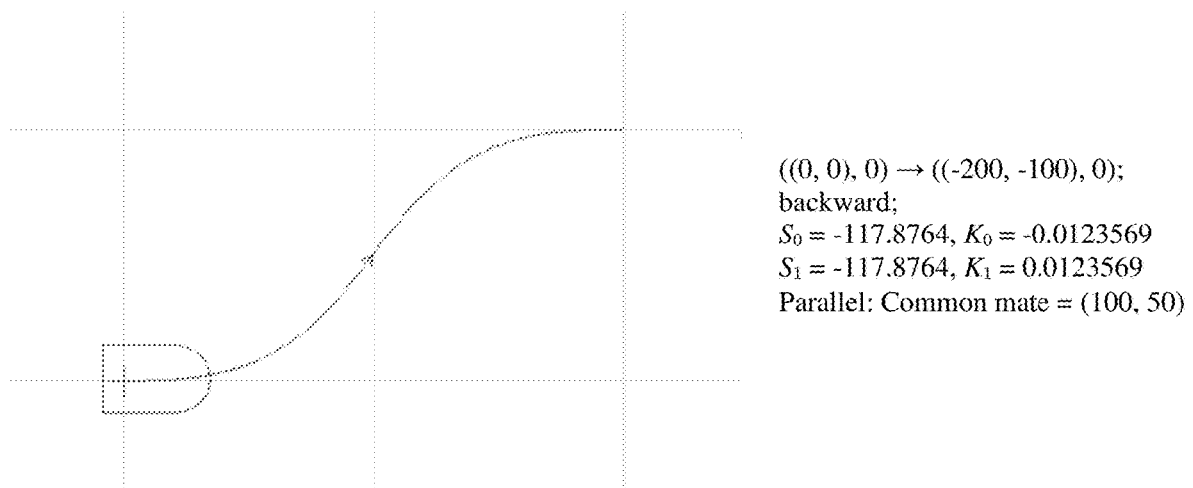
FIG. 15 illustrates a backward parallel motion.

This method gives us sample solutions, which are presented in FIG. 14: parallel forward and in FIG. 15: parallel backward. An arrowhead on each trajectory indicates the common mate (or inflection point), where the curvature sign switches.

13. Pivot

Figure 16:
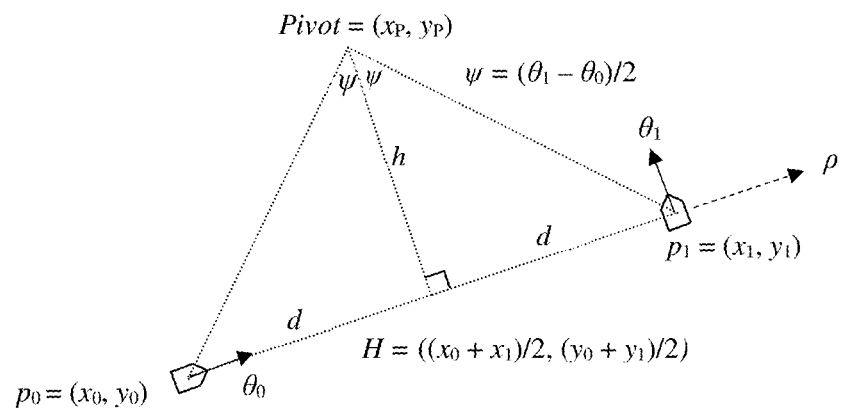
FIG. 16 depicts the pivot of (start, goal)=$(q_0, q_1)$ in the general case.

Let start=$(p_0, \theta_0)=((x_0, y_0), \theta_0)$ and goal=$(p_1, \theta_1)=((x_1, y_1), \theta_1)$ be two frames with $p_0 \neq p_1$ and $\theta_1 \neq \theta_0$. Then, there exists a point P such that P is equidistant from $p_0$ and $p_1$, and the signed angle $\angle\_p_0 P p_1 = \theta_1 - \theta_0 = 2\psi$. We call that point P the pivot of start and goal. (FIG. 16)

Lemma 13: Pivot Lemma
The coordinates of Pivot P are:

$$P = \begin{bmatrix} x_P \\ y_P \end{bmatrix} = \begin{bmatrix} \frac{x_0+x_1}{2} - \frac{y_1-y_0}{2}\cot\psi \\ \frac{y_0+y_1}{2} + \frac{x_1-x_0}{2}\cot\psi \end{bmatrix}, \quad (13.1)$$

where $\psi = (\theta_1 - \theta_0)/2$.
Proof
In FIG. 16, H is the midpoint $$\left(\frac{x_0+x_1}{2}, \frac{y_0+y_1}{2}\right)$$

of $p_0$ and $p_1$. Let $\rho$ be the direction from $p_0$ to $p_1$, and 2d be the distance of $p_0 p_1$. Let h=HP denote a signed height of $\triangle p_0 P p_1$. Then, $$\sin\rho = \frac{y_1 - y_0}{\sqrt{(x_1-x_0)^2 + (y_1-y_0)^2}}$$

$$\cos\rho = \frac{x_1 - x_0}{\sqrt{(x_1-x_0)^2 + (y_1-y_0)^2}}$$

$$p_0 H = d = p_0 p_1/2 = \frac{1}{2}\sqrt{(x_1-x_0)^2 + (y_1-y_0)^2}$$

$$HP = h = \frac{d}{\tan\psi} = \frac{1}{2}\sqrt{(x_1-x_0)^2 + (y_1-y_0)^2}\cot\psi$$

Then, $$x_P = \frac{x_0+x_1}{2} + h\cos\left(\rho + \frac{\pi}{2}\right) = \frac{x_0+x_1}{2} - h\sin\rho =$$

-continued $$\frac{x_0+x_1}{2} - \frac{1}{2}\sqrt{(x_1-x_0)^2 + (y_1-y_0)^2}\cot\psi \frac{y_1-y_0}{\sqrt{(x_1-x_0)^2 + (y_1-y_0)^2}} =$$

$$\frac{x_0+x_1}{2} - \frac{y_1-y_0}{2}\cot\psi$$

$$y_P = \frac{y_0+y_1}{2} + h\sin\left(\rho + \frac{\pi}{2}\right) = \frac{y_0+y_1}{2} + h\cos\rho =$$

$$\frac{y_0+y_1}{2} + \frac{1}{2}\sqrt{(x_1-x_0)^2 + (y_1-y_0)^2}\cot\psi \frac{x_1-x_0}{\sqrt{(x_1-x_0)^2 + (y_1-y_0)^2}} =$$

$$\frac{y_0+y_1}{2} + \frac{x_1-x_0}{2}\cot\psi$$

QED

14. Solving Parking Problems in General Case

Let start=$(p_0, \theta_0)=((x_0, y_0), \theta_0)$ and goal=$(p_1, \theta_1)=((x_1, y_1), \theta_1)$ be two frames with $p_0 \neq p_1$ and $\theta_1 \neq \theta_0$. Consider a circle defined by three points, pivot P, $p_0$, and $p_1$, with P as its center. We call this circle the pivot circle.

Lemma 14.1: (External-Angle Lemma): Let start=$(p_0, \theta_0)$ and goal=$(p_1, \theta_1)$ be two frames with $p_0 \neq p_1$ and $\theta_1 \neq \theta_0$. Let P be the pivot of start and goal. Let $\psi=(\theta_1-\theta_0)/2$, and $p_2$ be an arbitrary point on the pivot circle between $p_0$ and $p_1$. (FIG. 17) Then, $$\angle p_0 p_2 p_1 = \pi - \psi \tag{14.1}$$

Proof

Figure 17:
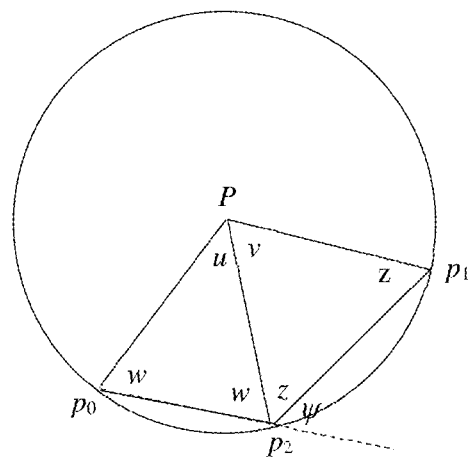
FIG. 17 describes the external-angle lemma.

We name the angles u, v, w, and z, as shown in FIG. 17. Then, we have $$u + 2w = \pi$$
$$v + 2z = \pi$$

By adding both sides up, we obtain $$u + v + 2(w + z) = 2\pi$$

or $$w + z = \pi - (u + v)/2 = \pi - 2\psi/2 = \pi - \psi.$$

QED

Figure 18:
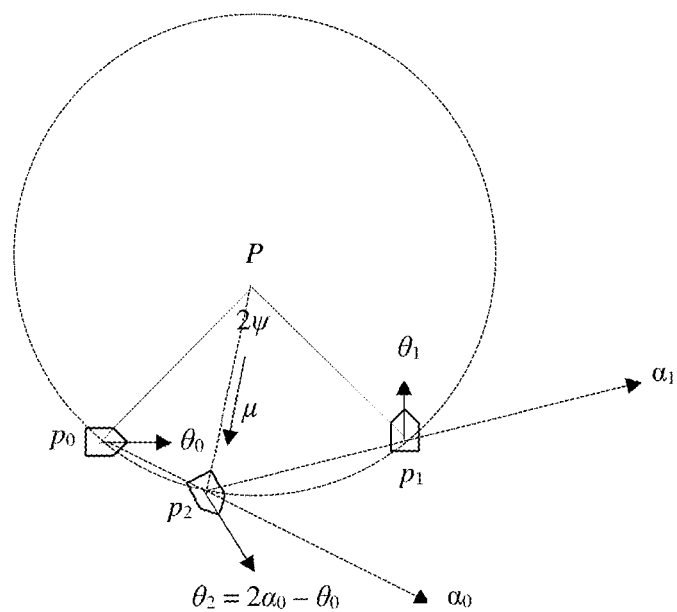
FIG. 18 describes a common-mate circle on a pivot.

Theorem 14.1 (Common-Mate Theorem in the general case):

Let $q_0=(p_0, \theta_0)$ and $q_1=(p_1, \theta_1)$ be two given frames with $p_0 \neq p_1$ and $\theta_0 \neq \theta_1$, and P be the pivot of $q_0$ and $q_1$. Furthermore, let $p_2$ be an arbitrary point on the pivot circle, $\alpha_0$ be the line from $p_0$ to $p_2$, and $\alpha_1$ be the line from $p_2$ to $p_1$, as shown in FIG. 18. Then, $q_2=(p_2, \theta_2)=(p_2, 2\alpha_0-\theta_0,)$ is a common mate of $q_0$ and $q_1$. (Further, let $\mu$ be the direction from P to $p_2$.)

Proof

Part I: Prove that $<q_0, q_2>$ is a mate.

Because $\theta_2 = 2\alpha_0 - \theta_0$, then $$(\alpha_0 - \theta_0) + (\alpha_0 - \theta_2) = \alpha_0 - \theta_0 + \alpha_0 - (2\alpha_0 - \theta_0) = 0.$$

Therefore, $<q_0, q_2>$ is a mate.

Part II: Prove that $<q_2, q_1>$ is a mate.

$$(\alpha_1 - \theta_2) + (\alpha_1 - \theta_1) = \alpha_1 - (2\alpha_0 - \theta_0) + \alpha_1 - \theta_1 =$$
$$2\alpha_1 - 2\alpha_0 - \theta_1 + \theta_0 = 2(\alpha_1 - \alpha_0 - (\theta_1 - \theta_0)) = 2(\alpha_1 - \alpha_0 - \psi)$$

On the other hand, by External-Angle Lemma, $\alpha_1-\alpha_0=(\theta_1-\theta_0)/2=\psi$. Therefore, $<q_2, q_1>$ is a mate.

QED

Figure 19:
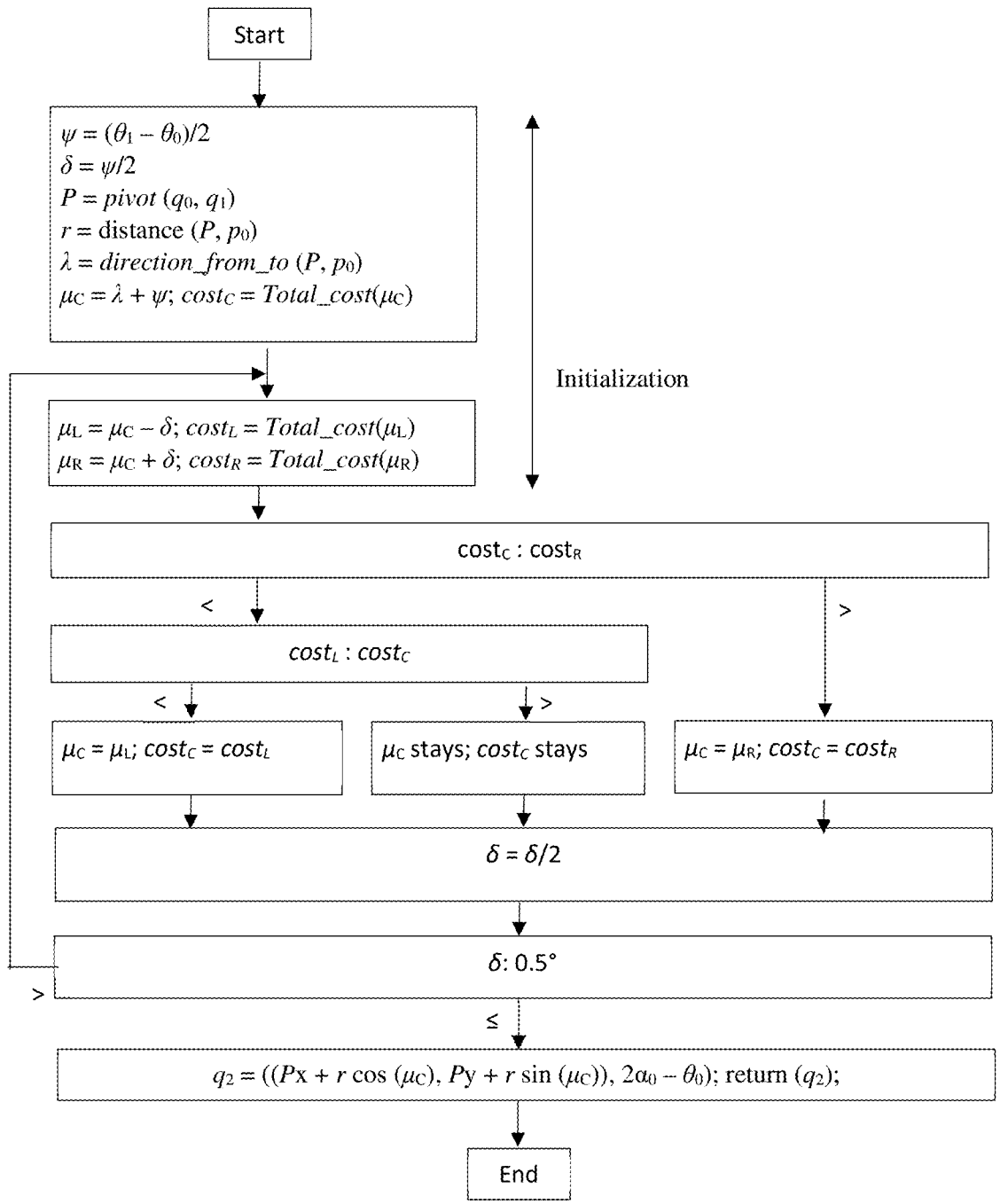
FIG. 19 illustrates the flowchart of a function, getLeastCostCommonMate (start, goal), that returns a least-cost common mate.

When a common mate (or inflection point) is found, we can create a two-arch motion with two arches <start, inflection> and <inflection, goal> as a solution. The following Theorem finds the best inflection that the sum of the cost of two arches minimized:

Theorem 14.2 (searching in general case) The algorithm depicted in FIG. 19 searches for the least-cost common mate.

15. An Outline of the Entire Parking-Motion Algorithm

Figure 20:
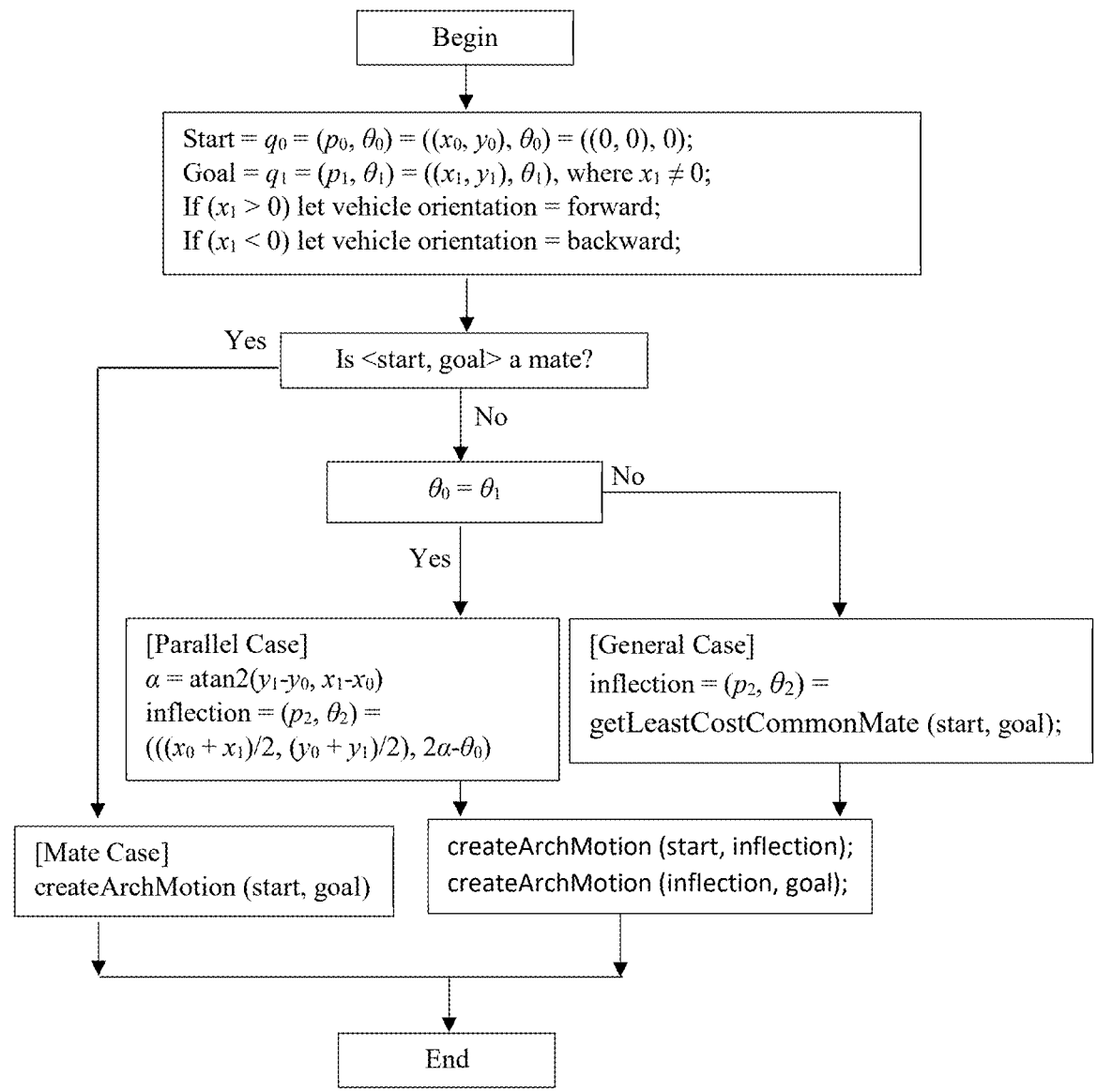
FIG. 20 outlines an entire algorithm for a parking motion including three situations about (start, goal).

The main task of the parking motion algorithm is to drive a vehicle from start to goal, where
  start=$(p_0, \theta_0)=((x_0, y_0), \theta_0)=((0, 0), 0)$, which is a constant, and
  goal=$(p_1, \theta_1)=((x_1, y_1), \theta_1)$, which is given by a user or determined by a processor, based upon sensor input,
  using a motion of one or two arch curves with minimal motion cost. (FIG. 20)

Figure 21:
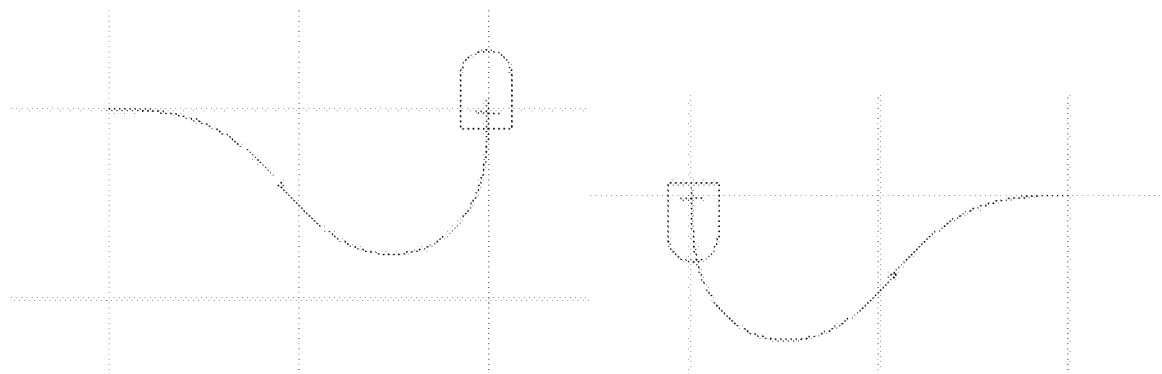
FIG. 21 showcases two general-case solutions, forward and backward.
Figure 22:
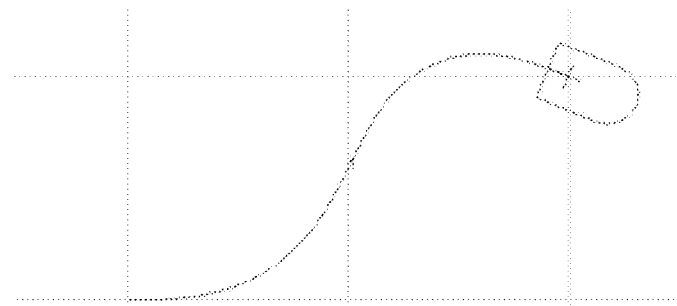
FIG. 22 showcases three forward-parking motions with common mates in general cases.
Figure 22:
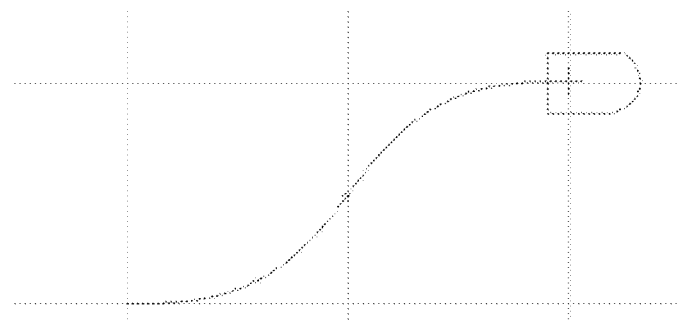
Figure 22:
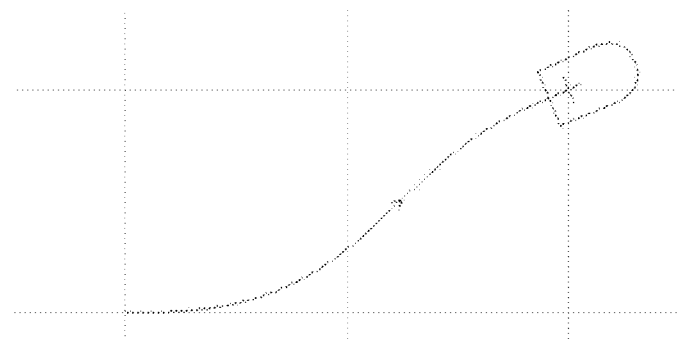
Figure 23:
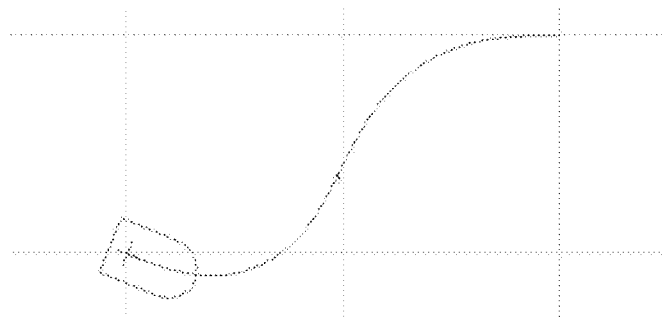
FIG. 23 showcases three backward-parking motions with common mates in general cases.
Figure 23:
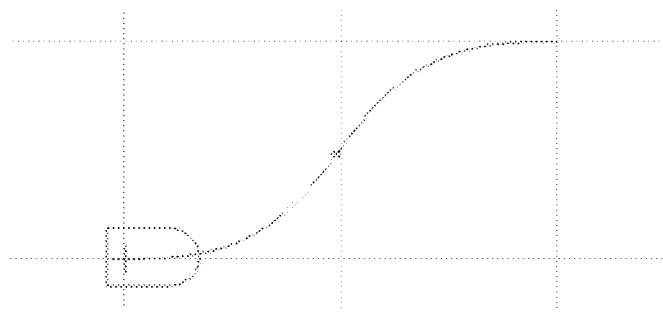
Figure 23:
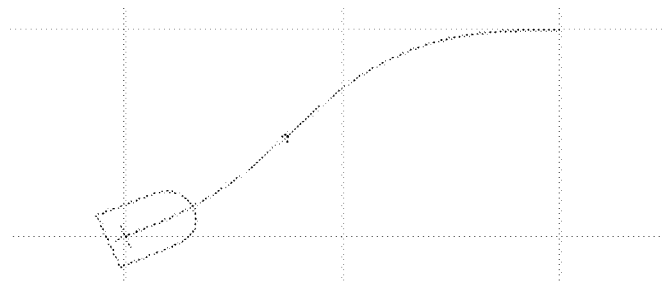

Exemplary parking motions in general cases are as follows:
  FIG. 21: Forward motion at left and backward motion at right.
  FIG. 22: Three forward motions
  FIG. 23: Three backward motions

16. Car-Like Vehicle

Figure 24:
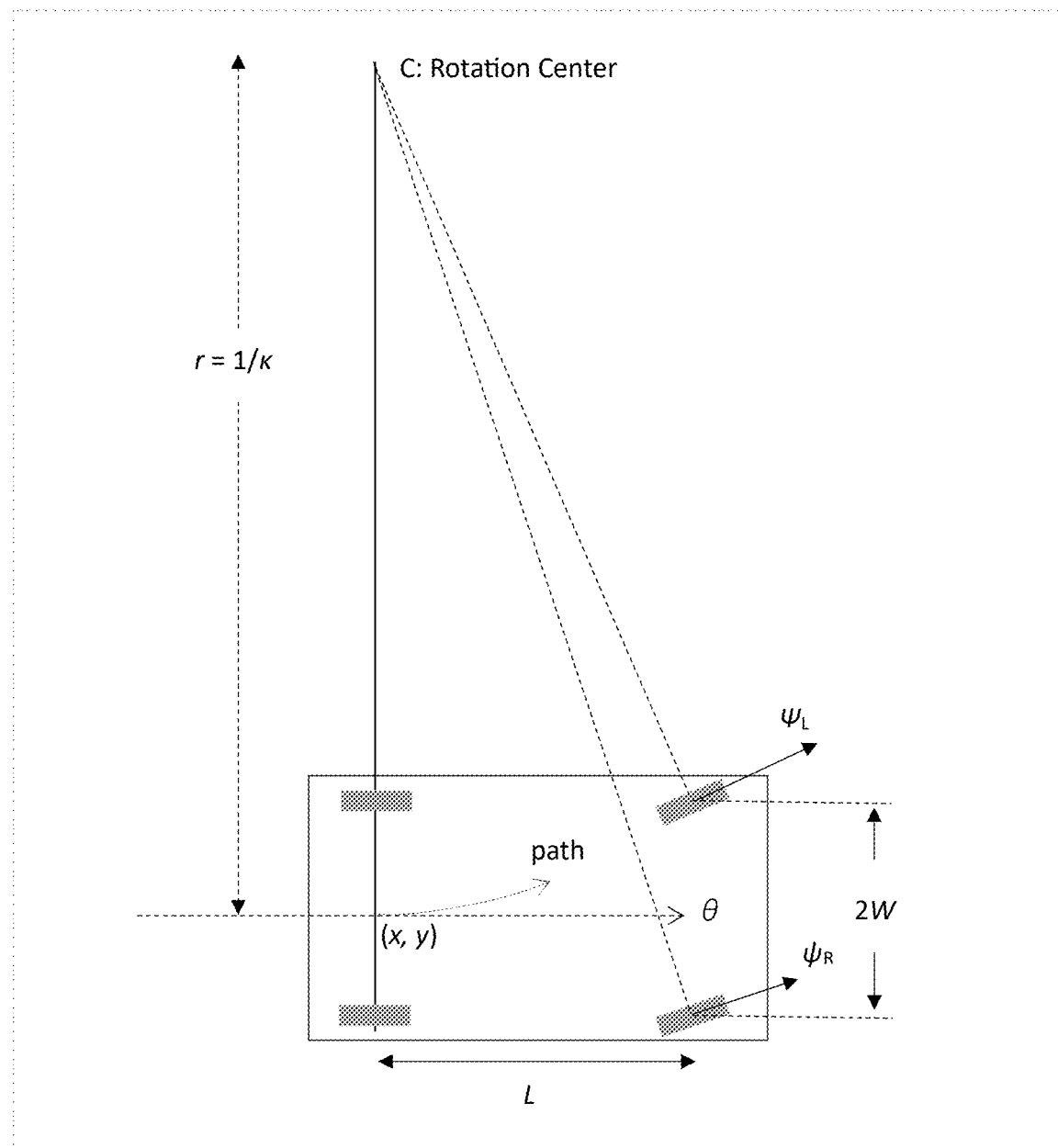
FIG. 24 describes the kinematics of a car-like vehicle.

We install this teaching in an exemplary vehicle, a car-like vehicle. This vehicle has two rear wheels and two front wheels. (FIG. 24) The rear wheels drive the vehicle with v, a commanded velocity. Let the front wheels' directions be $$\psi_L = \tan\left(\frac{L}{r-W}\right) = \tan\left(\frac{\kappa L}{1-\kappa W}\right) \tag{16.1}$$

$$\psi_R = \tan\left(\frac{L}{r+W}\right) = \tan\left(\frac{\kappa L}{1+\kappa W}\right) \tag{16.2}$$

Notice that $r=1/\kappa$. If $\kappa<0$, the center C of rotation is at the bottom side of FIG. 24. Therefore, the vehicles' steering embodies the commanded motion $(v, \kappa)$.

Figure 25:
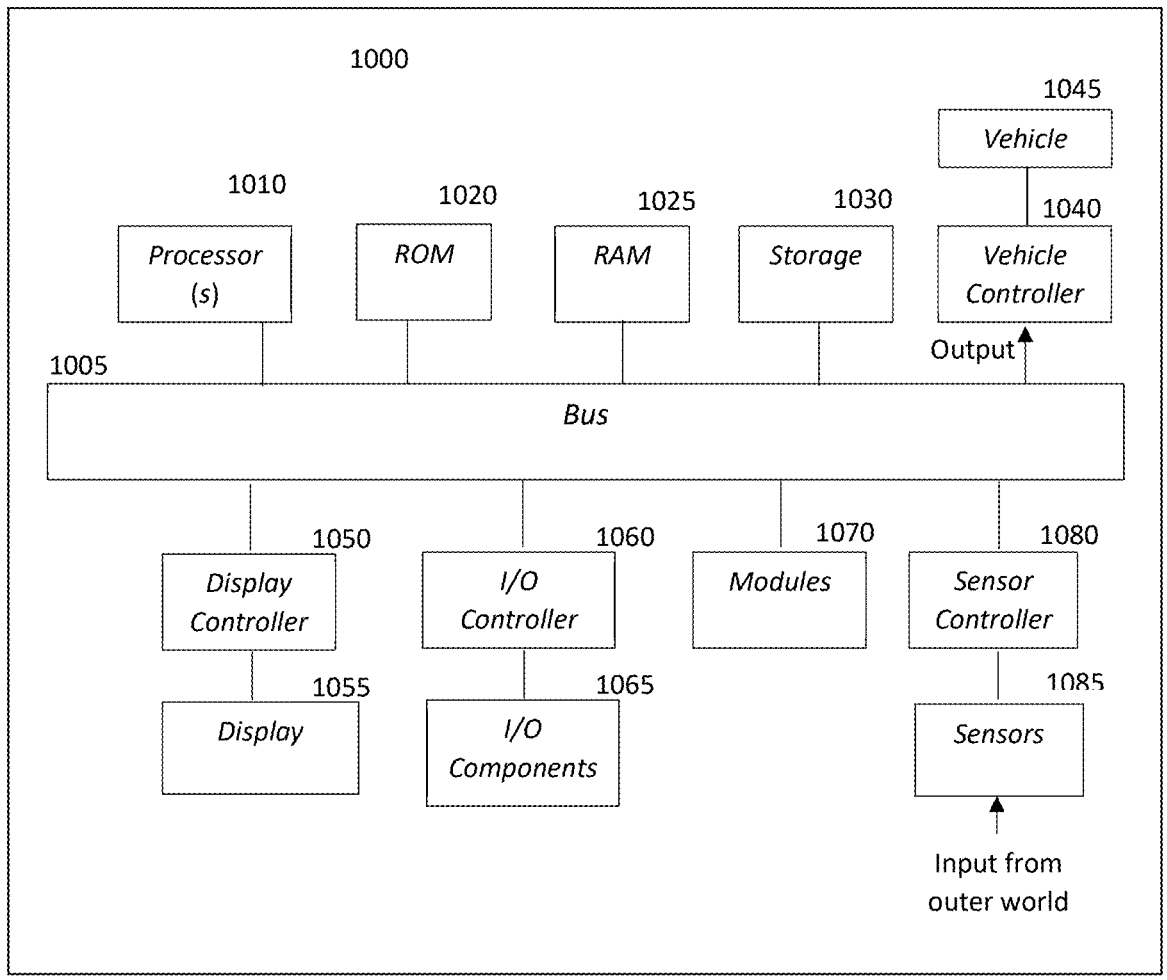
FIG. 25 illustrates a computer system architecture that embodies the parking-motion teaching.

We assume a vehicle controller in FIG. 25 can execute an arch motion. The main algorithm passes two parameters (S, K) as an output to the controller, which executes an arch motion:

$$\kappa(s) = K\sin(\pi s/S),\ 0 \le s \le S \text{ or } S \le s \le 0$$

FIG. 25 illustrates an exemplary block diagram of a computer system that executes this teaching. A computing system 1000 that can be used in conjunction with one or more of the embodiments described herein. The illustrated computing system 1000 can represent any of the devices or systems (e.g.

vehicle control system, engine control system, vision system, etc.) described herein that perform any of the processes, operations, or methods of the disclosure. Note that while the computing system 1000 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1000 can include a bus 1005 which can be coupled to one or more processors 1010, ROM 1020 (Read Only Memory), RAM 1025 (or volatile memory), and storage 1030 (or non-volatile memory). The processor(s) 1010 can retrieve stored instructions from one or more of the memories (e.g., ROM 1020, RAM 1025, and storage 1030) and execute the instructions to perform processes, operations, or methods described herein. These memories represent examples of a non-transitory machine-readable medium (or computer-readable medium) or storage containing instructions which when executed by a computing system (or a processor), cause the computing system (or processor) to perform operations, processes, or methods described herein. The RAM 1025 can be implemented as, for example, dynamic RAM (DRAM), or other types of memory that require power continually in order to refresh or maintain the data in the memory. Non-volatile memory (e.g., storage 1030) can include, for example, magnetic, semiconductor, tape, optical, removable, non-removable, and other types of storage that maintain data even after power is removed from the system. It should be appreciated that the non-volatile memory can be remote from the system (e.g. accessible via a network).

A display controller 1050 can be coupled to the bus 1005 in order to receive display data to be displayed on a display device 1055, which can display any one of the user interface features or embodiments described herein and can be a local or a remote display device. The computing system 1000 can also include one or more input/output (I/O) components 1065 including mice, keyboards, touch screen, network interfaces, printers, speakers, and other devices. Typically, the input/output components 1065 are coupled to the system through an input/output controller 1060.

Modules 1070 can represent any of the functions or engines described above, including components, units, functions, or logic. Modules 1070 can reside, completely or at least partially, within the memories described above, or within a processor during execution thereof by the computing system. In addition, modules 1070 can be implemented as software, firmware, or functional circuitry within the computing system, or as combinations thereof. In some embodiments, the functions described herein can utilize specialized hardware circuitry (or firmware) of the system.

In various embodiments, the input/output components 1065 and/or modules 1070 can include one or more vehicle sensors. In some embodiments, the input/output components 1065 and/or modules 1070 can further include global positioning system (GPS), accelerometers, inertial measurement units, gyroscopes, shaft rotational sensors, torque sensors, deflection sensors, pressure sensor, and flow sensors.

In one embodiment, the system 1000 includes a sensor controller 1080 and one or more sensors 1085. The sensors can be radar-based, an inertial motion unit, an ultrasonic sensor, a proximity sensor, a camera, a stereo vision, and a lane sensor. In some embodiments, the sensors are sonar sensors. The sensors 1085 may be configured to receiving information about objects and driving boundaries proximate to the vehicle 1045.

The system 1000 may include a vehicle controller 1040. The vehicle controller 1040 may be used to control the vehicle as described hereinabove with respect to the single arch or double arch motion. In one embodiment, the single arch or double arch motion is executed using the vehicle controller 1040 to control the vehicle 1045 using the calculated S, K variables described hereinabove. The vehicle controller 1040 may be configured to control the vehicle 1045 using a Cartesian coordinate system.

In one embodiment of the system 1000, the system 1000 receives location-based information associated with objects to avoid, e.g., other vehicles, driving boundaries e.g., center lines, walkways, curb positions. In some embodiments, the system 1000 may be configured to receive location-based information associated with objects to avoid and driving boundaries within a Cartesian coordinate system associated with a proximate location to the vehicle 1045. In some embodiments, the system 1000 may be configured to calculate location-based information associated with objects to avoid driving boundaries within a Cartesian coordinate system proximate to the vehicle 1045 using one or more known techniques.

Figure 26:
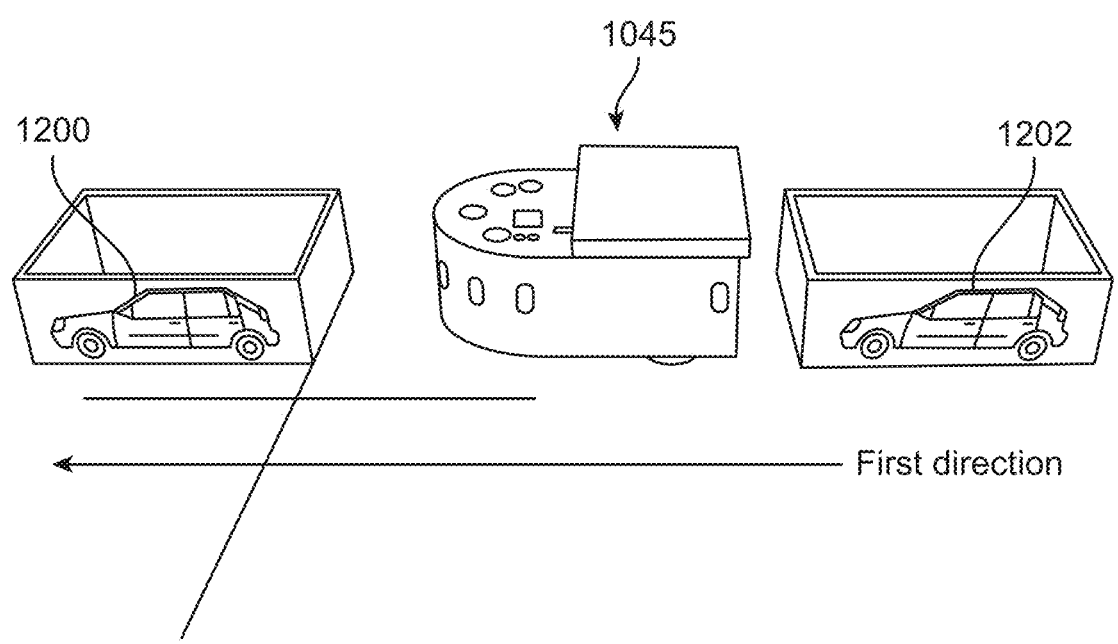
FIG. 26 depicts an example situation, parallel parking, for executing a single arch or double arch motion.

In use, with reference here to FIG. 26, an example is provided to illustrate the teachings herein. As shown in FIG. 26, we consider a situation where the vehicle must park on this mockup street, in a rear of a first vehicle 1200 and front of a second vehicle 1202, i.e., a parallel parking event. First, the vehicle drives in a first direction as shown in FIG. 26 while the vehicle's sonar 1085 scans other vehicles and the curb and determines the x-coordinate of the front end of the second vehicle 1202, the Y-coordinate of the curb, and the rear end of first vehicle 1200. System 1000 performs a safety check to see whether enough space between vehicles 1200 and 1202 exists to safely fit vehicle 1045.

If enough space exists, vehicle 1045 stops in a safe and legal position near vehicle 1200 and defines its frame as start=$q_0$=(($x_0$, $y_0$), $\theta_0$)=((0, 0), 0) in FIG. 26. The system 1000 computes a goal=$q_1$=(($x_1$, $y_1$), $\theta_1$), based upon the received information from the prior scanning, wherein, $x_1$<0.

The system 1000, including the processor 1010, calculates a single arch or double arch motion using the teachings herein. Finally, the vehicle 1045 executes a parallel-parking motion from the start frame to the goal frame, using instructions provided by the processor 1010, along the calculated single arch or double arch motion.

Figure 27:
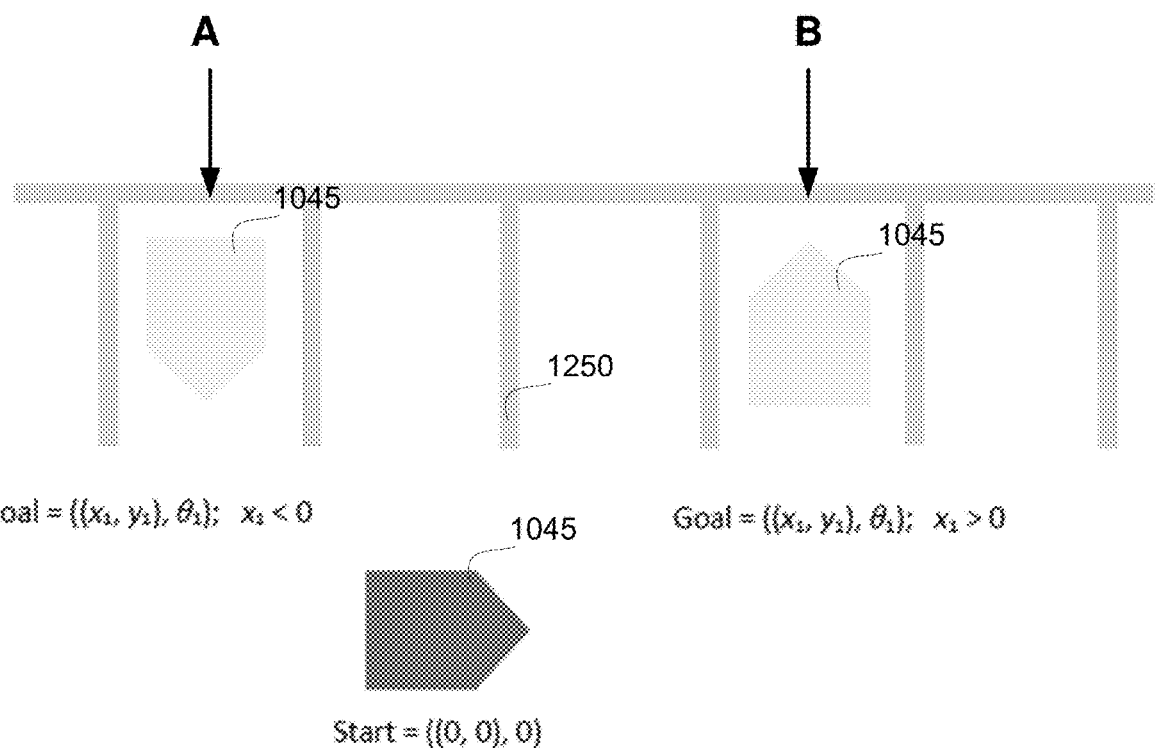
FIG. 27 depicts further parking examples, a forward parking event and a backward parking event for executing a single arch or double arch motion.

FIG. 27 shows another exemplary situation. As FIG. 27 shows, a vehicle 1045 begins in an initial starting position. The vehicle may park between any of the parking lot lines 1250. In one event, vehicle 1045 may execute a calculated single arch or double arch motion to make a backward parking motion into parking spot 'A', as shown. In one event, vehicle 1045 may execute a calculated single arch or double arch motion to make a forwards parking motion into parking spot 'B', as shown.

Before executing a single arch or double arch motion, the system 1000 can survey the parking lot using one or more sensors 1085. In one embodiment, these sensors 1085 are stereo vision sensors. The system 1000 can then detect the position and direction of each parking lot line 1250. In one embodiment, system 1000 uses a two-dimensional transformation theory to process and define parking lot lines 1250. Furthermore, the frame (($x_1$, $y_1$), $\theta_1$) of an empty parking slot for a vehicle is obtained if such a slot exists.

FIG. 27 shows another exemplary situation. As FIG. 27 shows, vehicle 1045 begins in an initial starting position. The vehicle may park between any of the parking lot lines 1250. In one event, vehicle 1045 may execute a single arch or double arch motion to make a backward parking motion into parking spot 'A,' as shown. In one event, vehicle 1045 may execute a single arch or double arch motion to make a forward parking motion into parking spot 'B,' as shown.

If $x_1$>0, the empty slot sits front of the vehicle, which moves forward into the slot head-in. If $x_1$<0, the empty slot is on the back side of the vehicle, which moves backward into the slot. In either case, the vehicle motion is created by this teaching: from start to goal.

In one embodiment of the system 1000, the processor 1010 receives a parking category type, which may be either: (1) parallel-parking type; (2) a forward-parking type; or (3) a backward-parking type. Each parking category type may be associated with a set of pre-defined visual objects to position in the coordinate system and safety tasks to comply with before executing a marking motion. In one embodiment, the parking category type may be supplied by a user-driver using a known I/O device into the system 1000.

In the case of a forward-parking category type, the processor 1010 may control the vehicle 1045 into a parking lot. The system 1000 uses the sensors 1085 to scan for an empty slot bounded by two parallel white lines such as shown in FIG. 27. The vehicle's present frame can be defined as $((x_0=0, y_0=0), \theta_0=0)$. The processor 1010 calculates a position and direction of slot as a goal position and direction $(p_1, \theta_1) = ((x_1, y_1), \theta_1)$. $(x_1 > 0)$ using information received from the sensors 1085.

In the case of a backward-parking category type, the processor 1010 may control the vehicle 1045 into a parking lot. The system 1000 uses the sensors 1085 to scan for an empty slot bounded by two parallel white lines such as shown in FIG. 27. The processor 1010 calculates a position and direction of slot as a goal position and direction $(p_1, \theta_1) = ((x_1, y_1), \theta_1)$. $(x_1 < 0)$ using information received from the sensors 1085.

The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

One embodiment provides an electronic device, comprising a non-transitory machine-readable medium to store instructions; one or more processors to execute the instructions; and a memory coupled to the one or more processors, the memory to store the instructions which, when executed by the one or more processors, cause the one or more processors to create motion for an autonomous vehicle.

VARIABLES AND THEIR MEANINGS $p = (x, y)$ is a position.
$\theta$ is a direction.
$(p, \theta)$ is a frame.
$p_0 = (x_0, y_0) = (0, 0)$ is the starting position of the vehicle.
$\theta_0 = 0$ is the starting direction of the vehicle.
$p_1 = (x_1, y_1)$ is a goal position.
$\theta_1$ is a goal direction.
s is an arc length of vehicle trajectories.
S and $S_0$ are the total arc lengths of vehicle trajectories.
$\kappa(s)$, $0 \le s \le S$ or $S \le s \le 0$ is a curve.
$\kappa(s) = K \sin(\pi s/S)$, $0 \le s \le S$ or $S \le s \le 0$ is an arch.
S, $S_0$, and $S_1$ are the total arc lengths of a curve.
A vehicle's orientation is either forward or backward, depending on the value of $x_1$.
If the vehicle's orientation is forward, the vehicle produces a forward motion, and s, S, $S_0$, and $S_1 > 0$. Otherwise, the vehicle produces a backward motion, and s, S, $S_0$, and $S_1 < 0$.
$\theta(s)$ is the direction of a curve at s.
p(s) is the position of a curve at s.
$\theta_0 = \theta(0)$ and $p_0 = p(0)$ for an arch.
$\theta_1 = \theta(S)$ and $p_1 = p(S)$ for an arch.
$\varphi$ is the end angle of an arch, $\theta_1 - \theta_0$.
K, $K_0$, and $K_1$ are the maximum curvature of an arch.
(S, K) is an arch, where S is the total arclength, and K is the maximum curvature.

The cost of a path $\kappa = k(s)$, $0 \le s \le S$ is equal to $\Gamma(\kappa(s)) = \int_0^S (d\kappa(s)/ds)^2 ds$.
The cost of an arch (S, K) is equal to $(\pi^4/8)(\varphi^2/S^3)$, where S is the total arclength, and $\varphi$ is the end angle.
The function distance (a, b) means the distance between a position a and a position b.
D is equal to distance $(p_0, p_1)$ in an arch called a cord.
$\Sigma(\varphi)$ is the arch-cord ratio at $\varphi$, S/D.
Let $q_0 = (p_0, \theta_0)$ and $q_1 = (p_1, \theta_1)$ be two frames with $p_0 \ne p_1$, and let $\alpha$ be the direction from position $p_0$ to position $p_1$. If $(\alpha - \theta_0) + (\alpha - \theta_1) = 0$ holds, we call the frame pair $<q_0, q_1>$ a mate. (FIG. 4)
$<q_A, q_B>$ means that frames $q_A$ and $q_B$ form a mate.
If $<q_A, q_B>$ and $<q_B, q_C>$ are mates, $q_B$ is called a common mate (or inflection) of $q_A$ and $q_C$.
The cost of a curve $\kappa = \kappa(s)$, $0 \le s \le S$ is calculated by: $\Gamma(\kappa(s)) = \int_0^S (d\kappa(s)/ds)^2 ds$.
The cost of an arch, (S, K), is calculated by $(\pi^4/8)(\varphi^2/S^3)$, where S is the total arc length and $\varphi$ is the end angle.
P is the pivot $(x_P, y_P)$ of start and goal.
Pivot circle is defied by P and start position and start direction and goal position and goal direction.
Let $p_2$ be an arbitrary point on the pivot circle, $\alpha_0$ be the line from $p_0$ to $p_2$, and $\alpha_1$ be the line from $p_2$ to $p_1$, as shown in FIG. 18. Then, $q_2 = (p_2, \theta_2) = (p_2, 2\alpha_0 - \theta_0,)$ is a common mate of start $q_0$ and goal $q_1$.
$\mu$ is the direction from P to the above $p_2$ or inflection point.
Cost2($\mu$) is the total cost Cost(arch($<q_0, q_2>$)) + Cost(arch($<q_2, q_1>$)).
getLeastCostCommonMate (start, goal) is a function that finds a common mate (inflection) that minimizes the total cost Cost2($\mu$).
Relations between K, S, and $\varphi$ in an arch are $KS = \pi\varphi/2$ and $\varphi = 2KS/\pi$.
$\alpha$ is the direction $(p_0, p_1)$ in an arch. (FIG. 8)
P is the pivot $(x_P, y_P)$ of start and goal.
$\psi$ is one-half of the end angle $\varphi$, equal to $(\theta_1 - \theta_0)/2$.
$\alpha_0$ is the direction from $p_0$ to $p_2$.
$\alpha_1$ is the direction from $p_2$ to $p_1$.
r is the radius of the common-mate circle.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

The invention claimed is:

1. A method for controlling an autonomous vehicle during a parking motion, comprising:
    receiving, via a processor onboard the vehicle, a starting vehicle position and a starting vehicle direction as $q_0 = (p_0, \theta_0) = ((x_0 = 0, y_0 = 0), 0)$;
    receiving, via the processor onboard the vehicle, a goal parking position and a goal parking direction as $q_1 = (p_1, \theta_1) = ((x_1, y_1), \theta_1)$, wherein $x_1$ is not equal to 0;
    receiving a predefined vehicle velocity, v;
    comparing a geometric relationship between $q_0$, the starting vehicle position and the starting vehicle direction, with $q_1$, the goal parking position and a goal parking direction;

determining whether $q_0$ and $q_1$ are a mate, parallel, or a general case;
calculating, via the processor onboard the vehicle, a continuous-curvature motion, which comprises either a single arch (S, K) or a double arch motion ($S_0$, $K_0$) and ($S_1$, $K_1$) based upon:
  the geometric relationship between $q_0$, and $q_1$, wherein the geometric relationship is either a mate, parallel, or a general case, the starting vehicle position, the starting vehicle direction, the goal parking position, and the goal parking direction; and
controlling the vehicle, which comprises a pair of front wheels and a pair of rear wheels, via instructions provided by the processor onboard the vehicle, based upon the calculated single arch or double arch motion, represented by:

$$\kappa(s) = K\sin\left(\frac{\pi s}{S}\right), 0 \le s \le S \text{ or } S \le s \le 0$$

wherein s is arc length, S is the total arc length, and K is the maximum curvature, by controlling the rear wheels to a velocity v, and
controlling a left, front wheel direction according to:

$$\psi_L = \tan\ (\kappa(s)L/(1-\kappa(s)W))$$

and controlling a right, front wheel direction according to:

$$\psi_R = \tan\ (\kappa(s)L/(1+\kappa(s)W))$$

wherein
W is half a distance between a centerpoint of the front wheels,
L represents a distance between a centerpoint of the front and rear wheels,
k represents a curvature defined as d$\theta$/ds, where $\theta$ is a vehicle's direction, and
s represents an arc length along either the single arch or the double arch motion.

2. The method of claim 1, further comprising:
comparing the starting vehicle position and the starting vehicle direction with the goal parking position and the goal parking direction to determine if they are a mate;
if they are a mate, then calculate the arch (S, K) by:
calculating $\varphi = \theta_1 - \theta_0$;
calculating D=distance ($p_0$, $p_1$);
calculating S=D$\Sigma(\varphi)$, wherein S is a total arc length of the arch (S, K);
if ($x_1$<0) calculating S=−S;
calculating K=$\pi\varphi$/(2S), wherein K is a maximum curvature of the arch (S, K); and
further controlling the vehicle based upon the calculated arch (S, K).

3. The method of claim 1, further comprising:
comparing the starting vehicle direction $\theta_0$ and the goal parking direction $\theta_1$,
  wherein if $\theta_0 = \theta_1$, then:
  calculating $\alpha = \tan^{-1}((y_1-y_0)/x_1)$;
  calculating an inflection position $p_2=((x_0+x_1)/2, (y_0+y_1)/2)$;
  calculating the inflection direction $=\theta_2=2\alpha-\theta_0$;
  calculating $\varphi_1 = \theta_2 - \theta_0$;
  calculating $D_1$=distance ($p_0$, $p_2$);
  calculating $S_1 = D_1 \Sigma(\varphi_1)$;
  if ($x_1$<0) calculating $S_1 = -S_1$;
  calculating $K_1 = \pi\varphi_1/(2S_1)$;
  further controlling the vehicle with ($S_1$, $K_1$);
  calculating $\varphi_2 = \theta_1 - \theta_2$;
  calculating $D_2$=distance ($p_2$, $p_1$);
  calculating $S_2 = D_2 \Sigma(\varphi_2)$;
  if ($x_1$<0) calculating $S_2 = -S_2$;
  calculating $K_2 = \pi\varphi_2/(2S_2)$; and
  further controlling the vehicle based upon the calculated ($S_2$, $K_2$).

4. The method of claim 1, further comprising:
comparing the starting vehicle position and the goal parking position, wherein if the starting vehicle position and direction and the goal parking position and direction are not a mate and the starting vehicle direction $\theta_0$ and the goal parking direction $\theta_1$ are not equal, then:
  calculating a pivot position of the starting vehicle position and the starting vehicle direction and the goal parking position and the goal parking direction;
  calculating a common mate circle based upon the starting vehicle position and the starting vehicle direction and the goal parking position and the goal parking direction and the calculated pivot position;
  searching for an inflection $q_2=(p_2, \theta_2)$ on the common mate circle that minimizes the total cost Cost2 ($\mu$)=Cost (arch (<$q_0$, $q_2$>))+Cost (arch (<$q_2$, $q_1$>)), wherein $\mu$ is a direction from the pivot position to the inflection;
  further controlling the vehicle to execute a two-arch motion comprising of arch (<$q_0$, $q_2$>)) and arch (<$q_2$, $q_1$>);
  calculating $\varphi_1 = \theta_2 - \theta_0$;
  calculating $D_1$=distance ($p_0$, $p_2$);
  calculating $S_1 = D_1 \Sigma(\varphi_1)$;
  if ($x_1$<0) calculating $S_1 = -S_1$;
  calculating $K_1 = \pi\varphi_1/(2S_1)$;
  further controlling the vehicle with ($S_1$, $K_1$);
  calculating $\varphi_2 = \theta_1 - \theta_2$;
  calculating $D_2$=distance ($p_2$, $p_1$);
  calculating $S_2 = D_2 \Sigma(\varphi_2)$;
  if ($x_1$<0) calculating $S_2 = -S_2$;
  calculating $K_2 = \pi\varphi_2/(2S_2)$; and
  further controlling the vehicle with ($S_2$, $K_2$).

5. The method of claim 1, further comprising:
further controlling the vehicle based upon a cost of a motion, wherein the cost of the motion, $\kappa = \kappa(s)$, $0 \le s \le S$ is calculated by:

$$\Gamma(\kappa(s)) = \int_0^S (d\kappa(s)/ds)^2 ds$$

wherein s represents an arc length associated with the vehicle's trajectory.

6. The method of claim 1, further comprising:
further controlling the vehicle based upon a cost of an arch, wherein the cost of an arch, (S, K), is calculated by:

$$(S, K) = (\pi^4/8)(\varphi^2/S^3)$$

wherein S is the total arc length and $\varphi$ is an end angle.

7. The method of claim 1, further comprising:
calculating, via the processor onboard the vehicle, and the received sensor information, parking lane positions and determining if safe and compliant; and further controlling the vehicle based upon the calculated parking lane positions.

8. The method of claim 7, further comprising:
receiving a parking category type, wherein the parking category type is one of: (1) a parallel-parking type; (2) a forward-parking type; or (3) a backward-parking type; and
further controlling the vehicle, using instructions received from the processor, based upon the received parking category type.

9. A method for controlling an autonomous vehicle during a parking motion, comprising:
receiving, via a processor onboard the vehicle, a starting vehicle position and a starting vehicle direction as $q_0=(p_0, \theta_0)=((x_0=0, y_0=0), 0)$;
receiving, via the processor onboard the vehicle, a goal parking position and a goal parking direction as $q_1=(p_1, \theta_1)=((x_1, y_1), \theta_1)$, wherein $x_1$ is not equal to 0;
receiving a predefined vehicle velocity, v;
comparing a geometric relationship between $q_0$, the starting vehicle position and the starting vehicle direction, with $q_1$, the goal parking position and a goal parking direction;
determining whether $q_0$ and $q_1$ are a mate, parallel, or a general case;
calculating, via the processor onboard the vehicle, a continuous-curvature motion, which comprises a double arch motion $(S_0, K_0)$ and $(S_1, K_1)$ based upon:
the geometric relationship between $q_0$, and $q_1$, wherein the geometric relationship is either a mate, parallel, or a general case, the starting vehicle position, the starting vehicle direction, the goal parking position, and the goal parking direction; and
controlling the vehicle, which comprises a pair of front wheels and a pair of rear wheels, via instructions provided by the processor onboard the vehicle, based upon the calculated double arch motion, represented by:

$$\kappa(s) = K\sin\left(\frac{\pi s}{S}\right), 0 \le s \le S \text{ or } S \le s \le 0$$

wherein s is arc length, S is the total arc length, and K is the maximum curvature, by controlling the rear wheels to a velocity v, and
controlling a left, front wheel direction according to:

$\psi_L=\tan(\kappa(s)L/(1-\kappa(s)W))$ and controlling a right, front wheel direction according to:

$\psi_R=\tan(\kappa(s)L/(1+\kappa(s)W))$ wherein
W is half a distance between a centerpoint of the front wheels,
L represents a distance between a centerpoint of the front and rear wheels,
κ represents a curvature defined as dθ/ds, where θ is a vehicle's direction, and
s represents an arc length along the double arch motion.

\* \* \* \* \*